(12) United States Patent
Wang et al.

(10) Patent No.: US 12,498,832 B2
(45) Date of Patent: *Dec. 16, 2025

(54) TOUCH CONTROL PANEL, TOUCH CONTROL DISPLAY PANEL, AND TOUCH CONTROL DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Yu Wang, Beijing (CN); Shun Zhang, Beijing (CN); Chang Luo, Beijing (CN); Ping Wen, Beijing (CN); Yuanqi Zhang, Beijing (CN); Yi Zhang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/801,875

(22) Filed: Aug. 13, 2024

(65) Prior Publication Data
US 2024/0402858 A1 Dec. 5, 2024

Related U.S. Application Data

(63) Continuation of application No. 17/789,219, filed as application No. PCT/CN2021/117463 on Sep. 9, 2021, now Pat. No. 12,118,170.

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0443* (2019.05);
(Continued)

(58) Field of Classification Search
CPC .... G06F 3/0446; G06F 3/0412; G06F 3/0443; G06F 2203/04111; G06F 2203/04112
See application file for complete search history.

(56) References Cited

U.S. PATENT DOCUMENTS 9,519,383 B2 * 12/2016 Nagarajan ............. G06F 3/0448
10,817,117 B2 * 10/2020 Son ........................ G06F 3/0448
(Continued)

*Primary Examiner* — Michael J Jansen, II
(74) *Attorney, Agent, or Firm* — Ling Wu; Stephen Yang; Ling and Yang Intellectual Property

(57) ABSTRACT

A touch control panel, a touch control display panel, and a touch control display apparatus are provided. The touch control panel includes multiple first touch control structures extending along a first direction and multiple second touch control structures extending along a second direction. The first touch control structure includes multiple first touch control electrodes and multiple first connecting parts, and the second touch control structure includes multiple second touch control electrodes and multiple second connecting parts. The first touch control electrode and the second touch control electrode are disposed in a same layer, and the first connecting part or the second connecting part is disposed in the same layer as the first touch control electrode.

20 Claims, 15 Drawing Sheets

(52) U.S. Cl.
CPC .............. *G06F 2203/04111* (2013.01); *G06F 2203/04112* (2013.01)

(56) References Cited

U.S. PATENT DOCUMENTS

| | | | |
|---|---|---|---|
| 11,392,230 B2* | 7/2022 | Lee | G06F 3/0446 |
| 11,442,574 B2* | 9/2022 | Zhang | G06F 3/0412 |
| 11,579,735 B2* | 2/2023 | Ye | G06F 3/0446 |
| 11,720,215 B2* | 8/2023 | Wang | G06F 3/0443 |
| | | | 345/174 |
| 11,758,789 B2* | 9/2023 | Bang | G06F 3/0448 |
| | | | 345/173 |
| 11,947,762 B2* | 4/2024 | Wang | G06F 3/0446 |
| 12,118,170 B2* | 10/2024 | Wang | G06F 3/0448 |
| 12,314,522 B2* | 5/2025 | Wang | G06F 3/0443 |
| 2014/0035602 A1* | 2/2014 | Nagarajan | G06F 3/0443 |
| | | | 324/686 |
| 2019/0087033 A1* | 3/2019 | Son | G06F 3/044 |
| 2021/0132720 A1* | 5/2021 | Lee | H10K 59/40 |
| 2022/0011917 A1* | 1/2022 | Zhang | G06F 3/0446 |
| 2022/0214768 A1* | 7/2022 | Ye | G06F 3/0446 |
| 2022/0308702 A1* | 9/2022 | Wang | G06F 3/0446 |
| 2022/0317810 A1* | 10/2022 | Wang | G06F 3/0445 |
| 2023/0022014 A1* | 1/2023 | Bang | H10K 59/131 |
| 2024/0184411 A1* | 6/2024 | Wang | G06F 3/0446 |
| 2024/0192819 A1* | 6/2024 | Wang | G06F 3/0446 |
| 2024/0402858 A1* | 12/2024 | Wang | G06F 3/044 |
| 2025/0053271 A1* | 2/2025 | Wang | G06F 3/0443 |

* cited by examiner

TOUCH CONTROL PANEL, TOUCH CONTROL DISPLAY PANEL, AND TOUCH CONTROL DISPLAY APPARATUS

CROSS-REFERENCE TO RELATED APPLICATION(S)

The present application is a continuation of U.S. application Ser. No. 17/789,219 filed on Jun. 27, 2022, which is a U.S. National Phase Entry of International Application No. PCT/CN2021/117463 having an international filing date of Sep. 9, 2021. The above-identified applications are incorporated herein by reference in their entirety.

TECHNICAL FIELD

Embodiments of the present disclosure relate to, but are not limited to, the field of touch control technology, and particularly to a touch control panel, a touch control display panel, and a touch control display apparatus.

BACKGROUND

Organic Light Emitting Diode (OLED) is an active light emitting display component with advantages of self-illumination, wide viewing angle, high contrast, low power consumption, and extremely high response speed, etc. With the continuous development of display technology, a flexible display device with OLED as a light emitting device and Thin Film Transistor (TFT) for implementing signal control has become a mainstream product in the display field at present.

Limited by product requirements such as flexibility and foldability, and narrow frame, etc., a touch control panel is disposed in a touch control OLED display device, and the touch control panel adopts a structural form of Flexible Multi Layer On Cell (FMLOC), and the touch control panel is disposed on an encapsulation layer of an OLED backplane, and has advantages of lightness and thinness, and foldability. Considering reducing resistance and improving sensitivity, a driving electrode (Tx) and an induction electrode (Rx) in the touch control panel adopts a form of metal mesh. Compared with using a transparent conductive material (such as Indium Tin Oxide, ITO) to form touch control electrodes, the metal mesh has the advantages of low resistance, less thickness and fast response speed.

SUMMARY

The following is a summary of subject matters described herein in detail. The summary is not intended to limit the protection scope of claims.

In a first aspect, the present disclosure provides a touch control panel, including: a plurality of first touch control structures extending along a first direction and a plurality of second touch control structures extending along a second direction, wherein the plurality of first touch control structures are arranged along the second direction, and the plurality of second touch control structures are arranged along the first direction; a first touch control structure includes a plurality of first touch control electrodes and a plurality of first connecting parts, and a second touch control structure includes a plurality of second touch control electrodes and a plurality of second connecting parts, wherein the first direction and the second direction intersect; the first touch control electrodes and the second touch control electrodes are disposed in a same layer, and the first connecting parts or the second connecting parts are disposed in the same layer as the first touch control electrodes; the touch control panel further includes: at least one touch control branch positioned at an edge of a touch control electrode, an extending direction of each touch control branch intersects with an extending direction of the edge of the touch control electrode at which the touch control branch is positioned, the extending direction of the touch control branch is different from the first direction and the second direction, and the touch control electrode includes a first touch control electrode and/or a second touch control electrode; a length of the touch control branch is greater than a length of a connecting part disposed in the same layer as the first touch control electrodes along a third direction, the third direction is the same as an extending direction of part of touch control branches, and intersects with the first direction and the second direction.

In some possible implementations, the touch control branch includes: a branch body and at least one protrusion positioned at an edge of the branch body; when a quantity of the touch control branches is at least two, the at least two touch control branches are spaced apart from each other, and the at least two touch control branches are positioned at two sides of the touch control electrode.

In some possible implementations, a length of the branch body is greater than half of a length of the touch control electrode, where the touch control branch is positioned, along the extending direction of the touch control branch.

In some possible implementations, the branch body includes a first side and a second side opposite to each other and a third side and a fourth side opposite to each other; the third side is connected with the touch control electrode where the touch control branch is positioned; the at least one protrusion is positioned at the first side and the second side of the branch body; protrusions positioned at the first side of the branch body are staggered with protrusions positioned at the second side of the branch body.

In some possible implementations, a width of a protrusion close to the touch control electrode where the touch control branch is positioned is greater than a width of a protrusion away from the touch control electrode in which the touch control branch is positioned.

In some possible implementations, when the touch control electrode includes the first touch control electrode and the second touch control electrode, a touch control branch on the first touch control electrode is a first touch control branch, wherein the first touch control branch includes a first branch body and at least one first protrusion positioned at an edge of the first branch body; a touch control branch on the second touch control electrode is a second touch control branch, wherein the second touch control branch includes a second branch body and at least one second protrusion positioned at an edge of the second branch body; when quantities of first touch control branches and second touch control branches are both at least two, the at least two first touch control branches are spaced apart from each other, and the at least two second touch control branches are spaced apart from each other; at least one first touch control branch is positioned between adjacent second touch control branches, and at least one second touch control branch is positioned between adjacent first touch control branches; a maximum spacing between adjacent first touch control branches is greater than a maximum width of the second touch control branches; a maximum spacing between adjacent second touch control branches is greater than a maximum width of the first touch control branches.

In some possible implementations, a first groove is formed between adjacent first touch control branches, and a second touch control branch and the first groove fit with each other; a second groove is formed between adjacent second touch control branches, and a first touch control branch and the second groove fit with each other.

In some possible implementations, a shape of the first branch body and a shape of the second branch body both include a rectangle; a shape of the first protrusion and a shape of the second protrusion both include a rectangle, a triangle, or a wavy shape.

In some possible implementations, the first touch control branch and the first touch control electrode are an integrally formed structure; the second touch control branch and the second touch control electrode are an integrally formed structure.

In some possible implementations, the touch control panel includes: a buffer layer, a bridge connection layer, an insulating layer, a touch control layer, and a protection layer stacked sequentially; the touch control layer includes the plurality of first touch control electrodes, the plurality of first connecting parts, and the plurality of second touch control electrodes; the plurality of first touch control electrodes and the plurality of first connecting parts are alternately disposed and connected in turn, and the plurality of second touch control electrodes are spaced; the bridge connection layer includes the plurality of second connecting parts, each of the second connecting parts includes two first connecting structures symmetrically disposed with respect to a first symmetrical axis, each of the first connecting structures includes a first bonding pad part and a first connecting bridge; the first bonding pad part is configured to be connected with an adjacent second touch control electrode through a via hole on the insulating layer, the first connecting bridge is configured to be connected to the first bonding pad part, wherein the first symmetry axis extends along the second direction.

In some possible implementations, the first connecting bridge has a closed-loop structure composed by a plurality of first connecting traces.

In some possible implementations, the touch control panel includes: a buffer layer, a bridge connection layer, an insulating layer, a touch control layer, and a protection layer stacked sequentially; the touch control layer includes the plurality of second touch control electrodes, the plurality of second connecting parts, and the plurality of first touch control electrodes; the plurality of second touch control electrodes and the plurality of second connecting parts are alternately disposed and connected in turn, and the plurality of first touch control electrodes are spaced; the bridge connection layer includes the plurality of first connecting parts, each of the first connecting parts includes two second connecting structures symmetrically disposed with respect to a second symmetrical axis, each of the second connecting structures includes a second bonding pad part and a second connecting bridge; the second bonding pad part is configured to be connected with an adjacent first touch control electrode through a via hole on the insulating layer, the second connecting bridge is configured to be connected to the first bonding pad part, wherein the second symmetry axis extends along the first direction.

In some possible implementations, the second connecting bridge has a closed-loop structure composed by a plurality of second connecting traces.

In some possible implementations, each of the first connecting parts includes: a first sub-connecting part, a first sub-connecting structure, and a second sub-connecting part; the first sub-connecting part and the second sub-connecting part are respectively positioned on first touch control branches of two first touch control electrodes which the first connecting part is connected to, and the first sub-connecting structure is positioned between the first sub-connecting part and the second sub-connecting part; a length of the first sub-connecting part along the third direction and a length of the second sub-connecting part along the third direction are both less than half of a length of the first touch control branches.

In some possible implementations, each of the second connecting parts includes: a third sub-connecting part, a second sub-connecting structure, and a fourth sub-connecting part connected to each other; the third sub-connecting part and the fourth sub-connecting part are respectively positioned on second touch control branches of two second touch control electrodes which the second connecting part is connected to, and the second sub-connecting structure is positioned between the third sub-connecting part and the fourth sub-connecting part; a length of the third sub-connecting part along the third direction and a length of the fourth sub-connecting part along the third direction are both less than half of a length of the second touch control branches.

In some possible implementations, a first touch control electrode, a second touch control electrode, a first connecting part, a second connecting part, and a touch control branch each include a plurality of mesh patterns; wherein, a mesh pattern is a polygon composed of metal lines.

In some possible implementations, the first touch control electrode is a planar electrode; or, the first touch control electrode includes a plurality of first electrodes extending along a fourth direction and a plurality of second electrodes extending along a fifth direction; a first electrode and a second electrode each include a plurality of mesh patterns, and a plurality of virtual regions are defined between the plurality of first electrodes and the plurality of second electrodes; the fourth direction and the fifth direction intersect, and the fourth direction and the fifth direction are both different from the first direction and the second direction.

In some possible implementations, when the first touch control electrode includes the plurality of first electrodes extending along the fourth direction and the plurality of second electrodes extending along the fifth direction, a width of a first boundary electrode is smaller than a width of a first non-boundary electrode, and a width of a second boundary electrode is smaller than a width of a second non-boundary electrode; wherein, the first boundary electrode is a first electrode close to a second touch control electrode, and the first non-boundary electrode is a first electrode positioned at one side of the first boundary electrode away from the second touch control electrode; the second boundary electrode is a second electrode close to a second touch control electrode, and the second non-boundary electrode is a second electrode positioned at one side of the second boundary electrode away from the second touch control electrode.

In some possible implementations, a first branch segment and a second branch segment are respectively disposed on a first electrode and a second electrode forming a virtual region; the first branch segment and the second branch segment positioned within the same virtual region are spaced apart from each other, or connected to each other; the first branch segment and the second branch segment each include a plurality of mesh patterns; shapes of the first branch segment and the second branch segment include a cross shape or a square shape.

In some possible implementations, the second touch control electrode is a planar electrode; or, the second touch control electrode includes a plurality of third electrodes extending along a fifth direction and a plurality of fourth electrodes extending along a fourth direction; a third electrode and a fourth electrode each include a plurality of mesh patterns, and a plurality of virtual regions are defined between the plurality of third electrode and the plurality of fourth electrode; the fourth direction and the fifth direction intersect, and the fourth direction and the fifth direction are both different from the first direction and the second direction.

In some possible implementations, when the second touch control electrode includes the plurality of third electrodes extending along the fifth direction and the plurality of fourth electrodes extending along the fourth direction, a width of a third boundary electrode is smaller than a width of a third non-boundary electrode, and a width of a fourth boundary electrode is smaller than a width of a fourth non-boundary electrode; wherein, the third boundary electrode is a third electrode close to a first touch control electrode, and the third non-boundary electrode is a third electrode positioned on one side of the third boundary electrode away from the first touch control electrode; the fourth boundary electrode is a fourth electrode close to a first touch control electrode, and the fourth non-boundary electrode is a fourth electrode positioned on one side of the fourth boundary electrode away from the first touch control electrode.

In some possible implementations, a third branch segment and a fourth branch segment are respectively disposed on a third electrode and a fourth electrode forming a virtual region; the third branch segment and the fourth branch segment positioned within the same virtual region are spaced apart from each other, or connected to each other; the third branch segment and the fourth branch segment each include a plurality of mesh patterns; shapes of the third branch segment and the fourth branch segment include a cross shape or a square shape.

In some possible implementations, the touch control panel further includes: a metal structure disposed in a same layer as the touch control electrode; the metal structure is positioned within a virtual region, and the metal structure includes a plurality of mesh patterns.

In some possible implementations, a length of the first touch control branch is about 450 microns to 600 microns; a length of the second touch control branch is about 450 microns to 600 microns.

In a second aspect, the present disclosure also provides a touch control display panel, including a display panel and a touch control panel as described above; the touch control panel is positioned at a light emitting side or a backlight side opposite to the light emitting side of the display panel; the display panel includes a substrate, wherein the substrate includes a light emitting region and a non-light emitting region, the light emitting region includes a plurality of sub pixels arranged periodically, and the non-light emitting region includes a sub pixel edge positioned between adjacent sub pixels; the touch control panel includes a plurality of metal meshes composed of metal lines; a region surrounded by orthographic projections of metal lines on the substrate contains an orthographic projection of at least one sub pixel on the substrate, and an orthographic projection of the sub pixel edge on the substrate contains the orthographic projections of the metal lines on the substrate.

In a third aspect, the present disclosure also provides a touch control display apparatus, including the touch control display panel as described above.

After reading and understanding the drawings and the detailed description, other aspects may be understood.

BRIEF DESCRIPTION OF THE DRAWINGS

The accompanying drawings are used for providing understanding of technical solutions of the present disclosure, and form a part of the specification, and together with embodiments in the present disclosure, are used for explaining the technical solutions of the present disclosure, and do not form a limitation on the technical solutions of the present disclosure.

DETAILED DESCRIPTION

Figure 1A:
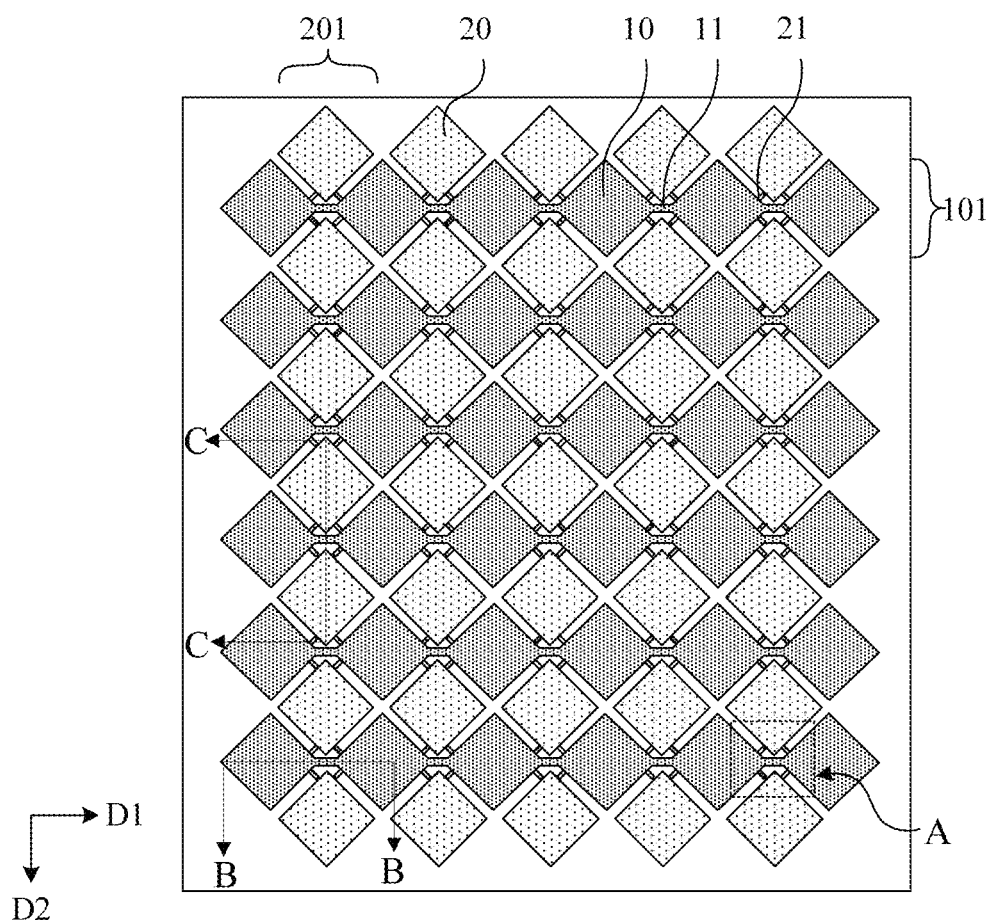
FIG. 1A is a schematic diagram of a structure of a touch control panel provided by an embodiment of the present disclosure.

In the drawings, a size of each constituent element, a thickness of a layer or a region is sometimes exaggerated for clarity. Therefore, an implementation of the present disclosure is not necessarily limited to the size, and shapes and sizes of various components in the drawings do not reflect actual scales. In addition, the drawings schematically illustrate ideal examples, and an implementation of the present disclosure is not limited to the shapes, numerical values, or the like shown in the drawings.

Ordinal numerals such as "first", "second", and "third" in the specification are set to avoid confusion of constituent elements, but not for limitation in quantity.

In the specification, for convenience, wordings indicating orientations or positional relationships, such as "center", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be interpreted as limitations on the present disclosure. The positional relationships between the constituent elements may be changed as appropriate according to directions of the constituent elements described. Therefore, appropriate variations can be made according to situations without being limited to the wordings described in the specification.

In the specification, unless otherwise specified and defined explicitly, terms "mount", "mutually connect", and "connect" should be interpreted in a broad sense. For example, a connection may be a fixed connection, or a detachable connection, or an integrated connection. It may be a mechanical connection or an electrical connection. It may be a direct mutual connection, or an indirect connection through an intermediate element, or internal communication between two components. Those of ordinary skill in the art may understand specific meanings of these terms in the present disclosure according to specific situations.

In the specification, a transistor refers to an element which at least includes three terminals, i.e., a gate electrode, a drain electrode and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region that the current mainly flows through.

In the specification, a first electrode may be the drain electrode, and a second electrode may be the source electrode. Or, the first electrode may be the source electrode, and the second electrode may be the drain electrode. In a case that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connection" includes a case that constituent elements are connected together through an element with a certain electrical effect. The "element with a certain electrical effect" is not particularly limited as long as electrical signals may be sent and received between the connected constituent elements. Examples of the "element with a certain electrical effect" not only include electrodes and wirings, but also include switch elements such as transistors, resistors, inductors, capacitors, and other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulating film" may be replaced with an "insulating layer" sometimes.

In the present disclosure, "about" refers to that a boundary is not defined strictly and numerical values within process and measurement error ranges are allowed.

Foldable OLED display devices are impressive for their convenient use experience and cool shape design. However, the touch control design of foldable products faces technical challenges. Due to the particularity and diversity of foldable OLED stacked structure, a touch control structure in the foldable OLED display devices can no longer meet requirements of new products. Changes of thickness and dielectric constant of the stacked structure of the foldable OLED display device make a signal amount of a touch control parameter of the touch control structure in the foldable OLED display device relatively small, which leads to deterioration of a touch control performance of a touch control panel.

Figure 1B:
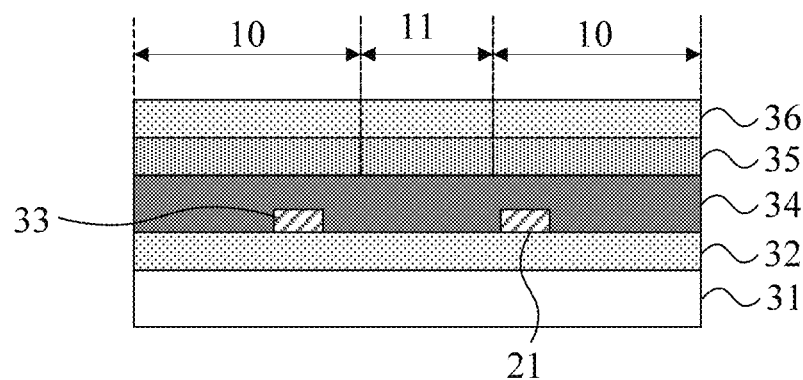
FIG. 1B is a cross-sectional view of FIG. 1A along a B-B direction.
Figure 1C:
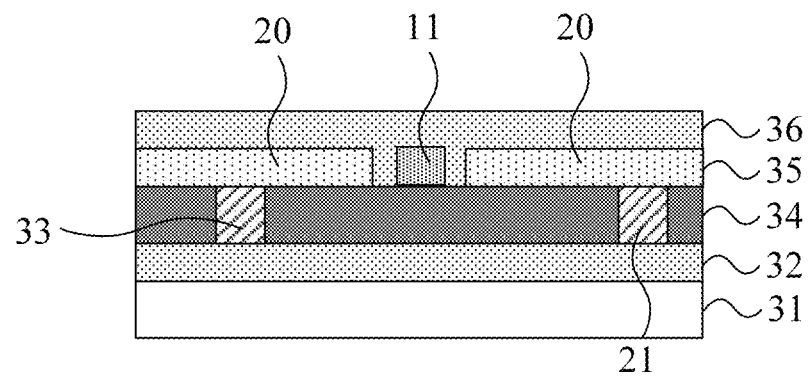
FIG. 1C is a cross-sectional view of FIG. 1A along a C-C direction.
Figure 2:
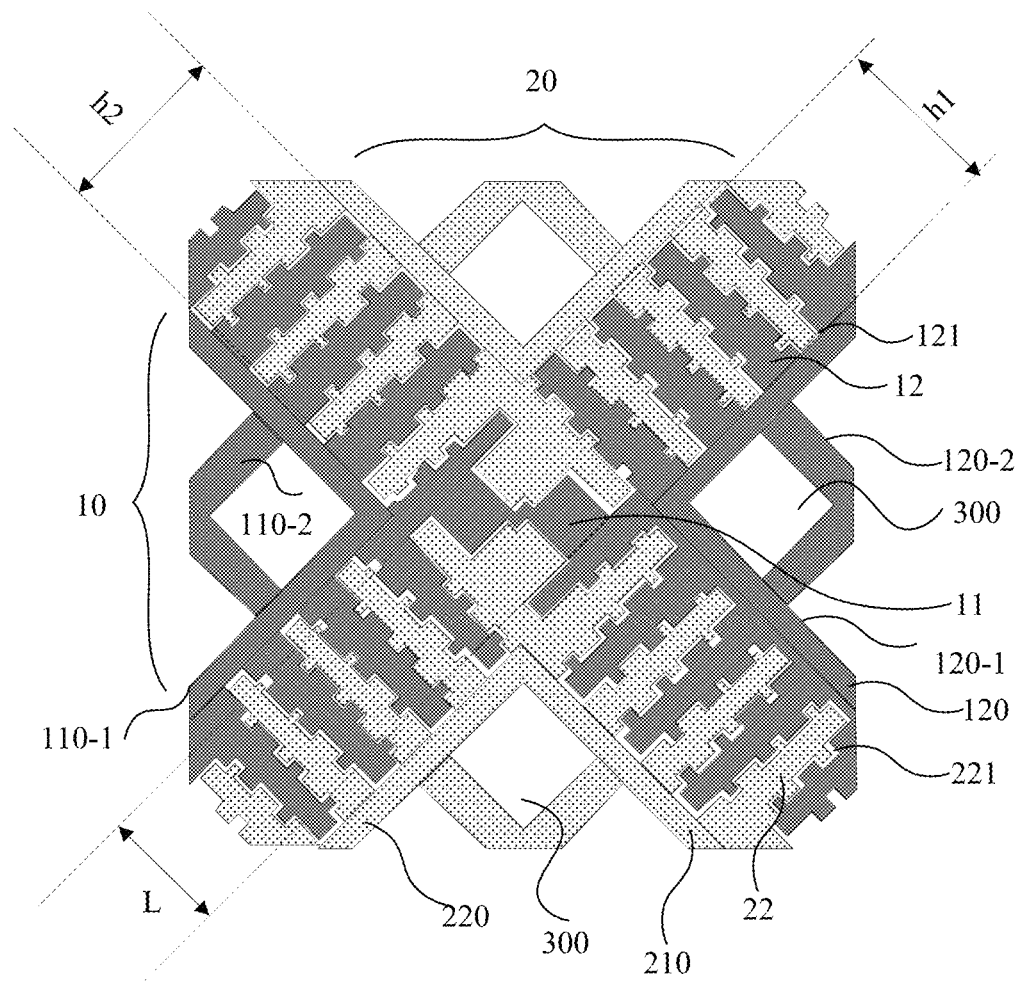
FIG. 2 is a first enlarged view of the region A in FIG. 1.

FIG. 1A is a schematic diagram of a structure of a touch control panel provided by an embodiment of the present disclosure, FIG. 1B is a cross-sectional view of FIG. 1A along a B-B direction, FIG. 1C is a cross-sectional view of FIG. 1A along a C-C direction, and FIG. 2 is a first enlarged view of region A in FIG. 1. As shown in FIGS. 1 and 2, a touch control panel provided by an embodiment of the present disclosure includes multiple first touch control structures 101 extending along a first direction D1 and multiple second touch control structures 201 extending along a second direction D2, wherein the multiple first touch control structures 101 are arranged along the second direction D2, and the multiple second touch control structures 201 are arranged along the first direction D1. In an exemplary embodiment, the first touch control structure 101 may include multiple first touch control electrodes 10 and multiple first connecting parts 11, and the second touch control structure 201 may include multiple second touch control electrodes 20 and multiple second connecting parts 21. The first direction D1 and the second direction D2 intersect. The first touch control electrode 10 and the second touch control electrode 20 are disposed in a same layer, and the first connecting part 11 or the second connecting part 21 are disposed in a same layer as the first touch control electrode 10. FIG. 1 and FIG. 2 illustrate an example in which the first connecting part is disposed in a same layer as the first touch control electrode.

The touch control panel may also include at least one touch control branch positioned at an edge of the touch control electrode. An extending direction of each touch control branch intersects an extending direction of the edge of the touch control electrode at which the touch control branch is positioned, and the extending direction of the touch control branch is different from the first direction D1 and the second direction D2. Herein, the touch control electrode includes the first touch control electrode 10 and/or the second touch control electrode 20. A length of the touch control branch is greater than a length of a connecting part disposed in a same layer as the first touch control electrode along a third direction. Herein, the third direction may be the same as the extending direction of a part of the touch control branches, and intersect the first direction and the second direction. As shown in FIG. 2, the length of the touch control branch may be h1 or h2, and the length of the connecting part disposed in the same layer as the first touch control electrode along the third direction in FIG. 2 is a length L of the first connecting part. FIG. 2 illustrates an example in which the touch control electrode is the first touch control electrode and the second touch control electrode.

In an exemplary embodiment, the multiple first touch control electrodes 10, and the multiple second touch control electrodes 20 may be formed by a single patterning process. The first connecting part 11 and the second connecting part 21 are disposed in different layers.

In an exemplary embodiment, the first touch control electrode 10 and the second touch control electrode 20 may be disposed in a same layer and made of a same material, and have a same pattern, which may alleviate problems of poor shadow elimination and optical Moire Pattern which are caused by mutual interference due to differences in line widths etc. of different layers of metal meshes, and have a relatively good shadow elimination effect.

In an exemplary embodiment, the first touch control electrode 10 and the second touch control electrode 20 may be disposed in a same layer as the first connecting part 11. The first touch control electrode 10 and the first connecting part 11 may be in an interconnected integral structure, or the multiple first touch control electrodes 10, the multiple second touch control electrodes 20, and the multiple second connecting parts 21 may be disposed in a same layer. The second touch control electrode 20 and the second connecting part 21 may be in an interconnected integral structure.

In an exemplary embodiment, the first touch control structure 101 may be a driving electrode (Tx), and the second touch control structure 201 may be an induction electrode (Rx), or, the first touch control structure 101 may be an induction electrode (Rx), and the second touch control structure 201 may be a driving electrode (Tx), which is not limited in the present disclosure.

In an exemplary embodiment, the first touch control electrode 10 and the second touch control electrode 20 may have a rhombus shape, such as a regular rhombus, a horizontally longer rhombus, or a longitudinally longer rhombus. Exemplarily, the first touch control electrode 10 and the second touch control electrode 20 may have any one or more of shapes of triangle, square, trapezoid, parallelogram, pentagon, hexagon, and other polygons, which is not limited in the present disclosure. FIG. 1A and FIG. 2 illustrate an example in which the first touch control electrode 10 and the second touch control electrode 20 are in the rhombus shape.

In an exemplary embodiment, quantities of the first touch control structures 101 and the second touch control structures 201 may be set according to touch control accuracy.

A touch control panel provided by an embodiment of the present disclosure includes multiple first touch control structures extending along a first direction and multiple second touch control structures extending along a second direction, wherein a first touch control structure includes multiple first touch control electrodes and multiple first connecting parts, and a second touch control structure includes multiple second touch control electrodes and multiple second connecting parts; the first touch control electrodes and the second touch control electrodes are disposed in a same layer, and the first connecting parts or the second connecting parts are disposed in the same layer as the first touch control electrodes; the touch control panel further includes at least one touch control branch positioned at an edge of a touch control electrode, an extending direction of each touch control branch intersects with an extending direction of the edge of the touch control electrode at which the touch control branch is positioned, the extending direction of the touch control branch is different from the first direction and the second direction, and the touch control electrode includes a first touch control electrode and/or a second touch control electrode; a length of the touch control branch is greater than a length of a connecting part disposed in the same layer as the first touch control electrode along a third direction, and the third direction is the same as an extending direction of part of touch control branches, and intersects with the first direction and the second direction. In the present disclosure, by making the length of the touch control branch greater than the length of the connecting part disposed in the same layer as the first touch control electrode, an interaction area of the first touch control structure and the second touch control structure can be increased, and a mutual capacitance value can be increased, which improves a signal amount of a low ground mass of the touch control panel, and optimizes a touch control performance of the touch control panel.

In an exemplary embodiment, the touch control branch may include a branch body and at least one protrusion positioned at an edge of the branch body.

In an exemplary embodiment, when a quantity of the touch control branches is at least two, the at least two touch control branches are spaced apart from each other, and the at least two touch control branches are positioned at two sides of the touch control electrode.

In an exemplary embodiment, a length of the branch body is greater than half of a length of the touch control electrode, where the touch control branch is positioned, along the extending direction of the touch control branch. In the present disclosure, that the length of the branch body is greater than half of the length of the touch control electrode, where the touch control branch is positioned, along the extending direction of the touch control branch, can make the length of the touch control branch be relatively long, increasing an interaction area of the first touch control structure and the second touch control structure, and increasing a mutual capacitance value.

In an exemplary embodiment, the branch body includes a first side and a second side opposite to each other and a third side and a fourth side opposite to each other; the third side is connected with the touch control electrode where the touch control branch is positioned; at least one protrusion is positioned at the first side and the second side of the branch body. Protrusions at the first side of the branch body are staggered with protrusions at the second side of the branch body. In the present disclosure, that the protrusions at the first side of the branch body are staggered with the protrusions at the second side of the branch body, can increase stability and reliability of the touch control branch structure.

In an exemplary embodiment, a width of the protrusion close to the touch control electrode where the touch control branch is positioned is greater than a width of the protrusion away from the touch control electrode where the touch control branch is positioned. In the present disclosure, that the width of the protrusion close to the touch control electrode is greater than the width of the protrusion away from the touch control electrode, can increase a surface area of the touch control branch, increase an interaction area of the first touch control structure and the second touch control structure, and increase a mutual capacitance value of the touch control panel.

In an exemplary embodiment, when the touch control electrode includes a first touch control electrode, a touch control branch on the first touch control electrode is a first touch control branch, and the first touch control branch may include a first branch body and at least one first protrusion positioned at an edge of the first branch body.

In an exemplary embodiment, when a quantity of first touch control branches is at least two, the at least two first touch control branches are spaced apart from each other, and a maximum spacing between adjacent first touch control branches is about 100 microns to 150 microns.

In an exemplary embodiment, when the touch control electrode includes a second touch control electrode, a touch control branch on the second touch control electrode is a second touch control branch, and the second touch control branch may include a second branch body and at least one second protrusion positioned at an edge of the second branch body.

In an exemplary embodiment, when a quantity of second touch control branches is at least two, the at least two second touch control branches are spaced apart from each other, and a maximum spacing between adjacent second touch control branches is about 100 microns to 150 microns.

Figure 3:
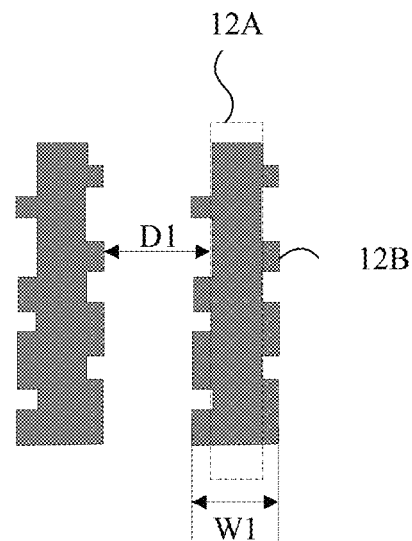
FIG. 3 is a schematic diagram of a structure of a first touch control branch provided by an exemplary embodiment.
Figure 4:
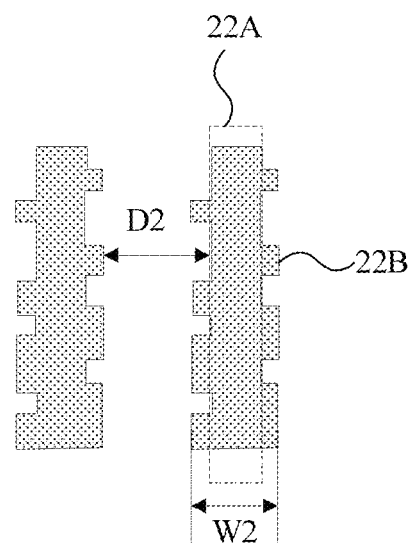
FIG. 4 is a schematic diagram of a structure of a second touch control branch provided by an exemplary embodiment.

In an exemplary embodiment, FIG. 3 is a schematic diagram of a structure of a first touch control branch provided by an exemplary embodiment, and FIG. 4 is a schematic diagram of a structure of a second touch control branch provided by an exemplary embodiment. As shown in FIGS. 2 to 4, when the touch control electrode includes a first touch control electrode 10 and a second touch control electrode 20, a touch control branch on the first touch control electrode 10 is a first touch control branch 12, wherein the first touch control branch 12 includes a first branch body 12A and at least one first protrusion 12B positioned at an edge of the first branch body 12A. A touch control branch on the second touch control electrode 20 is a second touch control branch 22, wherein the second touch control branch 22 includes a second branch body 22A and at least one second protrusion 22B positioned at an edge of the second branch body 22A. FIG. 3 illustrates an example in which the first touch control branch includes eight first protrusions, and FIG. 4 illustrates an example in which the second touch control branch includes eight second protrusions.

In an exemplary embodiment, when quantities of the first touch control branches 12 and the second touch control branches 22 are both at least two, the at least two first touch control branches 12 are spaced apart from each other, and the at least two second touch control branches 22 are spaced apart from each other; at least one first touch control branch 12 is positioned between adjacent second touch control branches 22, and at least one second touch control branch 22 is positioned between adjacent first touch control branches 12.

In an exemplary embodiment, a first groove 121 is formed between adjacent first touch control branches, and the second touch control branch and the first groove fit with each other. That the second touch control branch and the first groove fit with each other, refers to that when a partial region of the first touch control branch close to one side of the second touch control branch is a protrusion, a corresponding region of the second touch control branch close to the first touch control branch is a groove, and when a partial region of the first touch control branch close to one side of the second touch control branch is a groove, a corresponding region of the second touch control branch close to the first touch control branch is a protrusion. The match between an edge of the second touch control branch and edges of two adjacent first touch control branches, can increase an interaction area between the induction electrode and the driving electrode, and increase a mutual capacitance value, greatly improving a signal amount of a low ground mass of the touch control panel, and optimizing a touch control performance of the touch control panel.

In an exemplary embodiment, a second groove 221 is formed between adjacent second touch control branches, and the first touch control branch and the second groove fit with each other. In an exemplary embodiment, that the first touch control branch and the second groove fit with each other, refers to that when a partial region of the second touch control branch close to one side of the first touch control branch is a protrusion, a corresponding region of the first touch control branch close to the second touch control branch is a groove, and when a partial region of the second touch control branch close to one side of the first touch control branch is a groove, a corresponding region of the first touch control branch close to the second touch control branch is a protrusion. The match between an edge of the second touch control branch and edges of two adjacent first touch control branches, can increase an interaction area between the induction electrode and the driving electrode, and increase a mutual capacitance value, greatly improving a signal amount of a low ground mass of the touch control panel, and optimizing a touch control performance of the touch control panel.

In an exemplary embodiment, a maximum spacing D1 between adjacent first touch control branches may be greater than a maximum width W2 of the second touch control branches.

In an exemplary embodiment, a maximum spacing D2 between adjacent second touch control branches may be greater than a maximum width W1 of the first touch control branches.

In an exemplary embodiment, an edge of the first touch control branch 12 may be serrated, which may increase an interaction area of the first touch control structure and the second touch control structure, and increase a mutual capacitance value, improving a signal amount of a low ground mass of the touch control panel, and optimizing a touch control performance of the touch control panel.

In an exemplary embodiment, an edge of the second touch control branch 22 may be serrated, which may increase an interaction area of the first touch control structure and the second touch control structure, and increase a mutual capacitance value, improving a signal amount of a low ground mass of the touch control panel, and optimizing a touch control performance of the touch control panel.

In an exemplary embodiment, a shape of the first branch body 12A may include a rectangle.

In an exemplary embodiment, a shape of the second branch body 22A may include a rectangle.

In an exemplary embodiment, a shape of the first protrusion 12B may be a rectangle, a triangle, or a wavy shape.

In an exemplary embodiment, shapes of the second protrusions 22B are all rectangles, triangles, or wavy shapes.

In an exemplary embodiment, the first touch control branch 12 and the first touch control electrode 10 may be an integrally formed structure. That the first touch control branch and the first touch control electrode are an integrally formed structure, may simplify a manufacturing process of the touch control panel.

In an exemplary embodiment, the second touch control branch 22 and the second touch control electrode 20 may be an integrally formed structure. That the second touch control branch and the second touch control electrode are an integrally molded structure, may simplify the manufacturing process of the touch control panel.

In an exemplary embodiment, a length h1 of the first touch control branch 12 is about 450 microns to 600 microns.

In an exemplary embodiment, a length h2 of the second touch control branch 22 is about 450 microns to 600 microns.

As shown in FIGS. 1B and 1C, a touch control panel provided by an exemplary embodiment includes a buffer layer 32, a bridge connection layer 33, an insulating layer 34, a touch control layer 35, and a protection layer 36 stacked sequentially on a glass substrate 31. The touch control layer 35 includes multiple first touch control electrodes 10, multiple first connecting parts 11, and multiple second touch control electrodes 20; the multiple first touch control electrodes 10 and the multiple first connecting parts 11 are alternately disposed and connected in turn, and the multiple second touch control electrodes 20 are spaced. The bridge connection layer includes multiple second connecting parts 21. Alternatively, the touch control layer 35 includes multiple second touch control electrodes 20, multiple second connecting parts 21, and multiple first touch control electrodes 10; the multiple second touch control electrodes 20 and the multiple second connecting parts 21 are alternately disposed and connected in turn, and the multiple first touch control electrodes 10 are spaced; and the bridge connection layer includes multiple first connecting parts 11. FIGS. 1B and 1C illustrate an example in which the touch control layer 35 includes multiple first touch control electrodes 10, multiple first connecting parts 11, and multiple second touch control electrodes 20; the multiple first touch control electrodes 10 and the multiple first connecting parts 11 are alternately disposed and connected in turn, and the multiple second touch control electrodes 20 are spaced; and the bridge connection layer includes multiple second connecting parts 21.

In an exemplary embodiment, the bridge connection layer 33 and the touch control layer 35 may be made of a metal, such as any one or more of silver (Ag), copper (Cu), aluminum (Al), titanium (Ti), and molybdenum (Mo), or an alloy material of the above metals, such as aluminum neodymium alloy (AlNd) or molybdenum niobium alloy (MoNb), and the bridge connection layer 33 and the touch control layer 35 may be of a single-layer structure or a multi-layer composite structure, such as Mo/Cu/Mo, or the like.

In an exemplary embodiment, the buffer layer 32 and the insulating layer 34 may adopt any one or more of silicon oxide (SiOx), silicon nitride (SiNx), and silicon oxynitride (SiON), and may be a single-layer, multi-layers, or a composite layer.

In an exemplary embodiment, the protection layer 36 may be a glass cover plate.

Figure 5A:
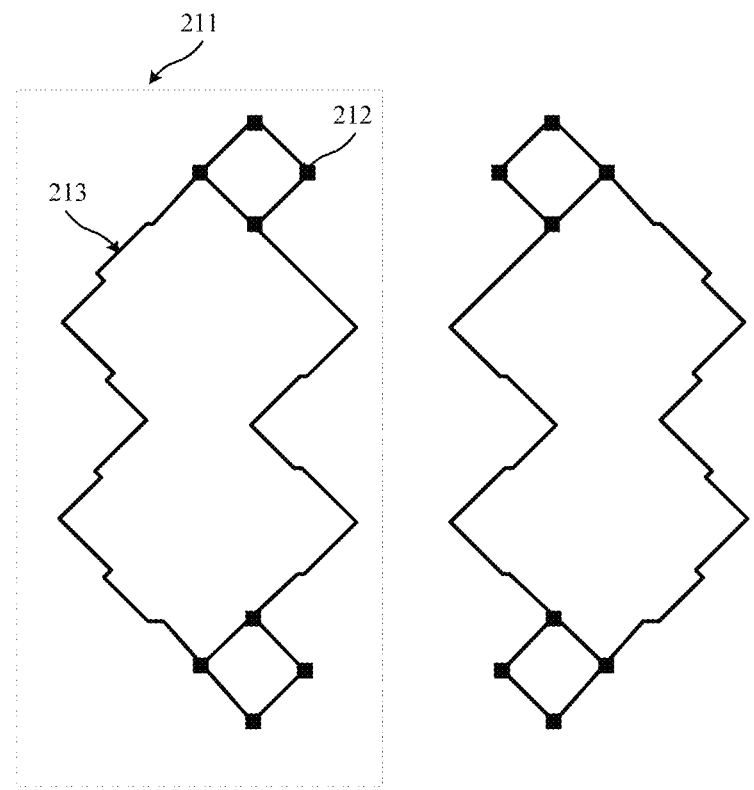
FIG. 5A is a first schematic diagram of a structure of a second connecting part provided by an exemplary embodiment.
Figure 5B:
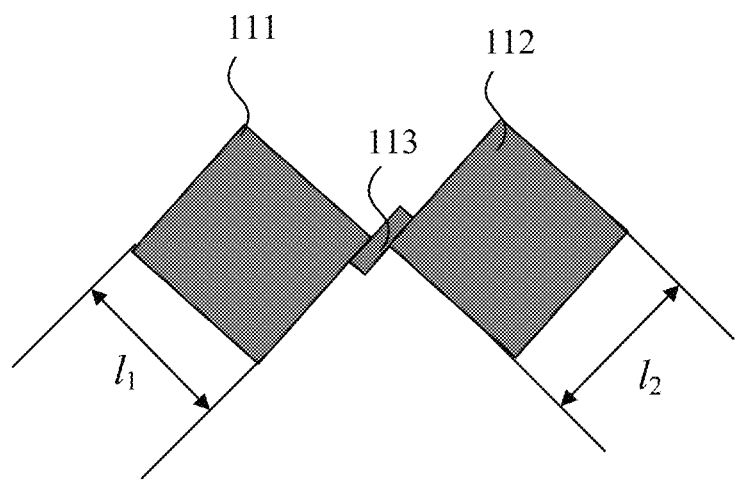
FIG. 5B is a first schematic diagram of a structure of a first connecting part provided by an exemplary embodiment.

In the case that the touch control layer 35 includes multiple first touch control electrodes 10, multiple first connecting parts 11, and multiple second touch control electrodes 20; the multiple first touch control electrodes 10 and the multiple first connecting parts 11 are alternately disposed and connected in turn, and the multiple second touch control electrodes 20 are spaced; and the bridge connection layer includes multiple second connecting parts 21, FIG. 5A is a first schematic diagram of a structure of a second connecting part provided by an exemplary embodiment, and FIG. 5B is a first schematic diagram of a structure of a first connecting part provided by an exemplary embodiment. As shown in FIG. 5A, each of the second connecting parts may include two first connecting structures 211 disposed symmetrically with respect to a first symmetrical axis, and each of the first connecting structures 211 may include a first bonding pad part 212 and a first connecting bridge 213; the first bonding pad part 212 is configured to be connected with an adjacent second touch control electrode through a via hole on the insulating layer; and the first connecting bridge 213 is configured to be connected to the first bonding pad part 212. The first symmetrical axis extends in the second direction.

In an exemplary embodiment, the first bonding pad part 212 may be disposed at two ends of the first connecting bridge 213.

In an exemplary embodiment, the first connecting bridge 213 may be of a closed-loop structure composed of multiple first connecting traces, or may be of an open-loop structure composed of multiple connecting traces sleeved in turn from small to large. FIG. 5A illustrates an example in which the first connecting bridge may be of the closed-loop structure composed of multiple first connecting traces.

In an exemplary embodiment, the first bonding pad part 212 positioned at an end of the first connecting bridge 213 may include 2 to 4 bonding pads, and the multiple bonding pads may be in an arrangement of a line, a triangle, or a square.

As shown in FIG. 5B, each of the first connecting parts 11 includes a first sub-connecting part 111 and a second sub-connecting part 112 which are connected to each other. Herein, the first sub-connecting part 111 and the second sub-connecting part 112 are respectively positioned on the first touch control branches of the two first touch control electrodes which the first connecting part 11 is connected to.

In an exemplary embodiment, the first connecting part 11 may further include a first sub-connecting structure 113 positioned at the first sub-connecting part 111 and the second sub-connecting part 112. The first sub-connecting part 111, the second sub-connecting part 112, and the first sub-connecting structure 113 are an integrally formed structure.

In an exemplary embodiment, a length $l_1$ of the first sub-connecting part 111 along the third direction and a length $l_2$ of the second sub-connecting part 112 along the third direction may both be less than half of the length of the first touch control branch 12.

Figure 6A:
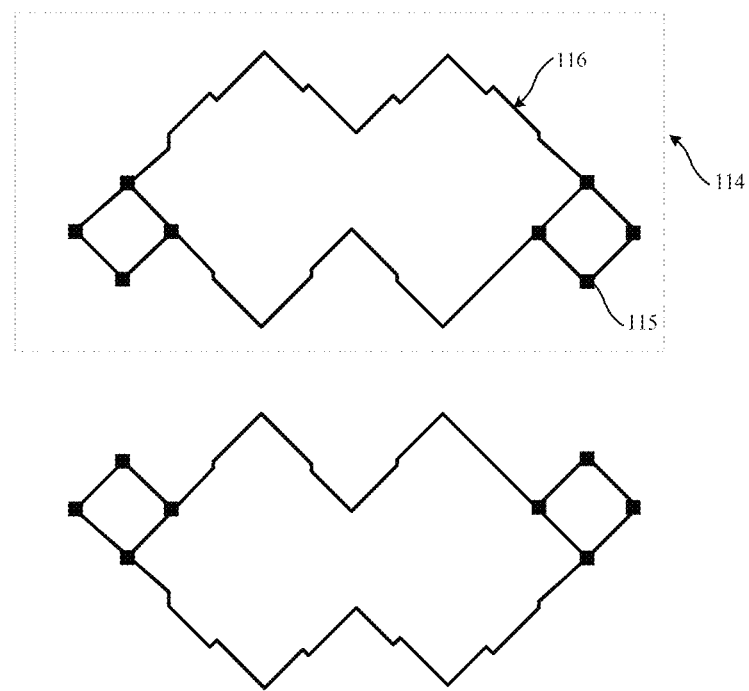
FIG. 6A is a second schematic diagram of a structure of a first connecting part provided by an exemplary embodiment.
Figure 6B:
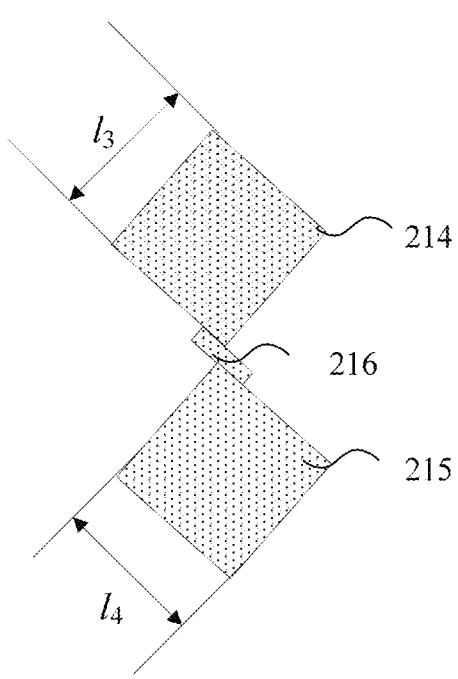
FIG. 6B is a second schematic diagram of a structure of a second connecting part provided by an exemplary embodiment.

In the case that the touch control layer 35 includes multiple second touch control electrodes 20, multiple second connecting parts 21, and multiple first touch control electrodes 10; the multiple second touch control electrodes 20 and the multiple second connecting parts 21 are alternately disposed and connected in turn, and the multiple first touch control electrodes 10 are spaced; and the bridge connection layer includes multiple first connecting parts 11, FIG. 6A is a second schematic diagram of a structure of a first connecting part provided by an exemplary embodiment, and FIG. 6B is a second schematic diagram of a structure of a second connecting part provided by an exemplary embodiment. As shown in FIG. 6A, each of the first connecting parts may include two second connecting structures 114 disposed symmetrically with respect to a second symmetrical axis. Each of the second connecting structures 114 may include a second bonding pad part 115 and a second connecting bridge 116; the second bonding pad part 115 is configured to be connected with an adjacent first touch control electrode through a via hole on the insulating layer, and the second connecting bridge 116 is configured to be connected to the second bonding pad part 115. Herein, the second symmetry axis extends along the first direction.

In an exemplary embodiment, the second bonding pad part 115 may be disposed at two ends of the second connecting bridge 116.

In an exemplary embodiment, the second bonding pad part 115 positioned at an end of the second connecting bridge 116 may include 2 to 4 bonding pads, and the multiple bonding pads may be in an arrangement of a line, a triangle, or a square.

In an exemplary embodiment, the second connecting bridge may be of a closed-loop structure composed of multiple second connecting traces, or may be of an open-loop structure composed of multiple connecting traces sleeved in turn from small to large. FIG. 6A illustrates an example in which the second connecting bridge may be of the closed-loop structure composed of multiple second connecting traces.

As shown in FIG. 6B, each of the second connecting parts includes a third sub-connecting part 214 and a fourth sub-connecting part 215 which are connected to each other. The third sub-connecting part 214 and the fourth sub-connecting part 215 are respectively positioned on the second touch control branches 22 of the two second touch control electrodes which the second connecting part is connected to.

In an exemplary embodiment, a length $l_3$ of the third sub-connecting part 214 along the third direction and a length $l_4$ of the fourth sub-connecting part 215 along the third direction are both less than half of the length of the second touch control branch.

In an exemplary embodiment, the second connecting part may also include a second sub-connecting structure 216 positioned between the third sub-connecting part 214 and the fourth sub-connecting part 215. The third sub-connecting part 214, the fourth sub-connecting part 215, and the second sub-connecting structure 216 are an integrally formed structure.

In an exemplary embodiment, the first touch control electrode 10, the second touch control electrode 20, the first connecting part 11, the second connecting part 21, and the touch control branch all include: multiple mesh patterns; herein, a mesh pattern is a polygon composed of metal lines.

Since a metal material has better malleability and is not easy to break, using a metal mesh may improve bending performance of the touch control panel to make the touch control panel more suitable for achieving a flexible touch control function, and may also reduce cost.

Figure 7A:
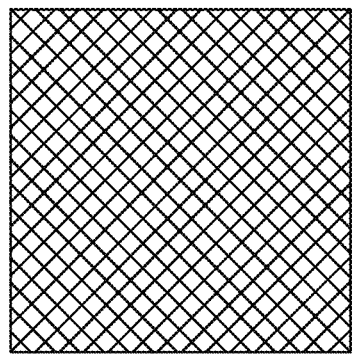
FIGS. 7A to 7E are schematic diagrams of structures of several metal meshes.
Figure 7B:
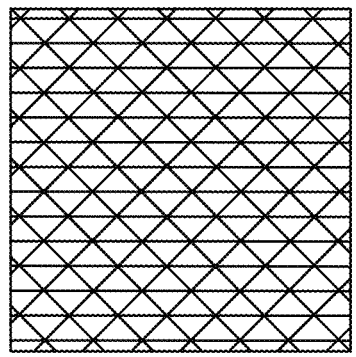
Figure 7C:
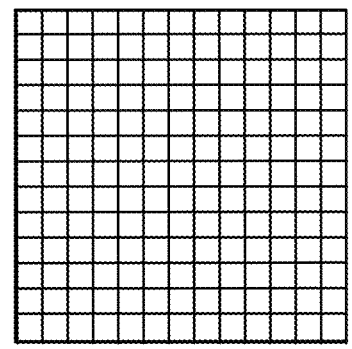
Figure 7D:
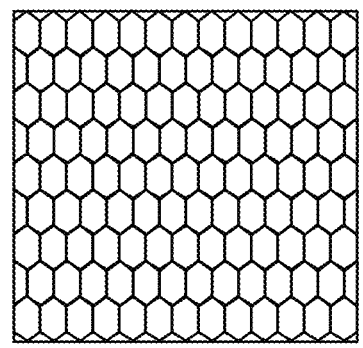
Figure 7E:
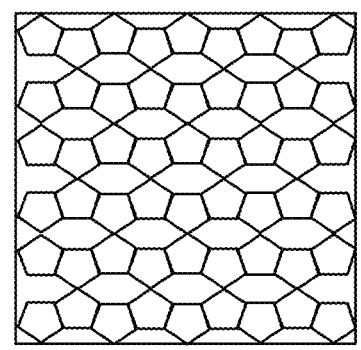

In an exemplary embodiment, FIGS. 7A to 7E are schematic diagrams of structures of several metal meshes. As shown in FIG. 5, a metal mesh includes multiple mesh patterns, wherein a mesh pattern is a polygon composed of metal lines. In other words, a metal mesh is formed by repetition and consecutive splicing of a mesh pattern. In an exemplary embodiment, a shape of the mesh pattern formed by metal lines may be a rhombus, as shown in FIG. 7A. Or, the shape of the mesh pattern formed by the metal lines may be a triangle, as shown in FIG. 7B. Or, the shape of the mesh pattern formed by the metal lines may be a rectangle, as shown in FIG. 7C. Or, the shape of the mesh pattern formed by the metal lines may be a hexagon, as shown in FIG. 7D. Or, the shape of the mesh pattern formed by the metal lines may be a combination of multiple shapes, such as a combination of a pentagon and a hexagon, as shown in FIG. 7E. Or, the shape of the mesh pattern formed by the metal lines may include any one or more of a triangle, a square, a rectangle, a rhombus, a trapezoid, a pentagon, and a hexagon. Exemplarily, the shape of the mesh pattern formed by the metal lines may be regular or irregular, and edges of the mesh pattern may be straight lines or curves, which are not limited in the present disclosure.

Figure 8:
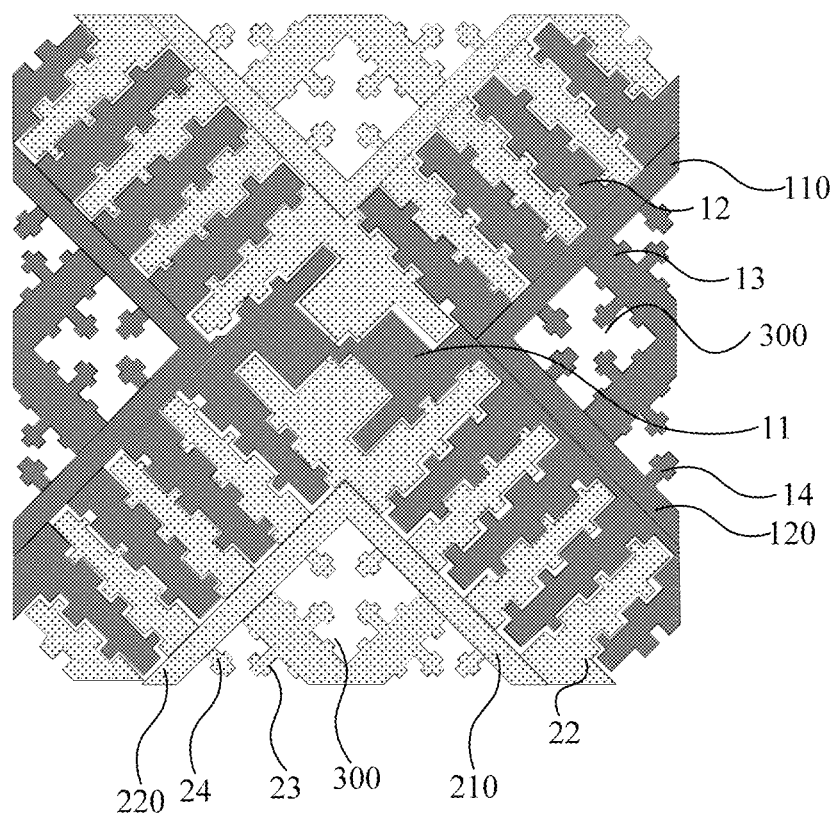
FIG. 8 is a second enlarged view of the region A in FIG. 1.
Figure 9:
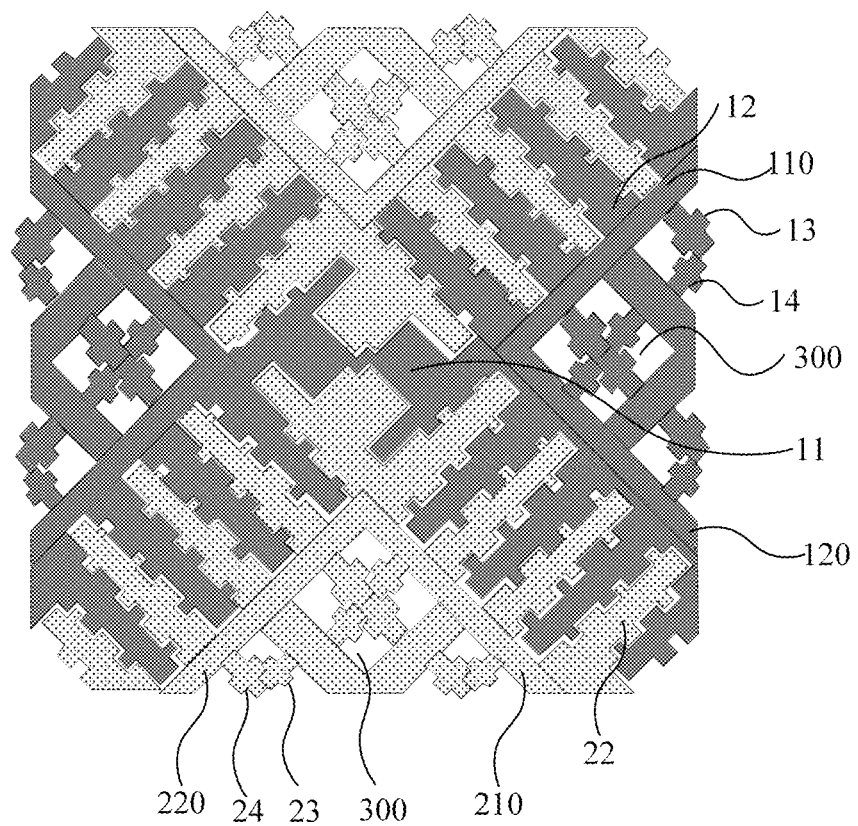
FIG. 9 is a third enlarged view of the region A in FIG. 1.
Figure 10:
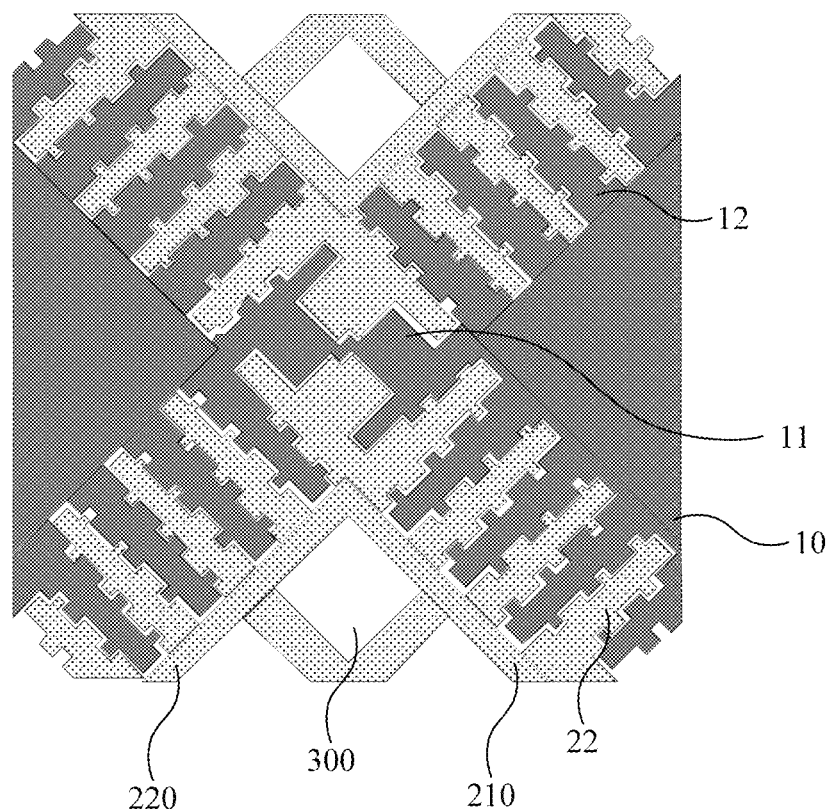
FIG. 10 is a fourth enlarged view of the region A in FIG. 1.
Figure 11:
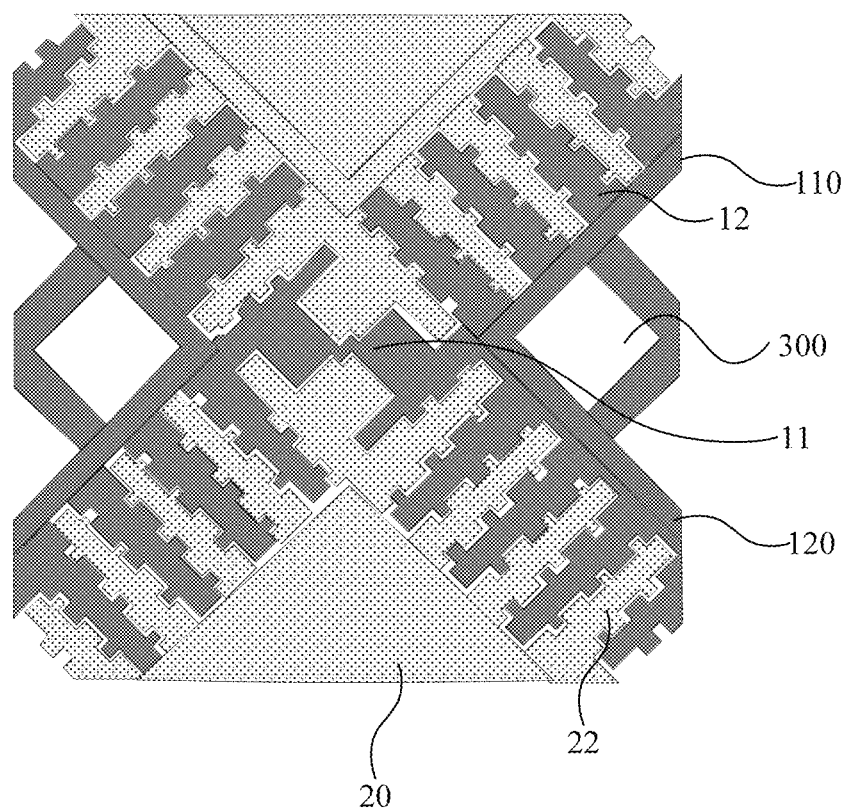
FIG. 11 is a fifth enlarged view of the region A in FIG. 1.

In an exemplary embodiment, FIG. 8 is a second enlarged view of region A in FIG. 1, FIG. 9 is a third enlarged view of region A in FIG. 1, FIG. 10 is a fourth enlarged view of region A in FIG. 1, and FIG. 11 is a fifth enlarged view of region A in FIG. 1. As shown in FIGS. 2, 8 to 11, the first touch control electrode 10 may be a planar electrode, or may include multiple first electrodes 110 extending along a fourth direction and multiple second electrodes 120 extending along a fifth direction. Herein, the first electrode 110 and the second electrode 120 both include multiple mesh patterns, and multiple virtual regions 300 are defined between the multiple first electrodes and the multiple second electrodes. Herein, the fourth direction and the fifth direction intersect, the fourth direction and the fifth direction are both different from the first direction and the second direction, and the third direction may be the same as the fourth direction or the fifth direction, which is not limited in the present disclosure.

In an exemplary embodiment, the second touch control electrode 20 may be a planar electrode, or may include multiple third electrodes 210 extending along the fifth direction and multiple fourth electrodes 220 extending along the fourth direction. Herein, the third electrode 210 and the fourth electrode 220 both include multiple mesh patterns, and multiple virtual regions 300 are defined between the multiple third electrodes and the multiple fourth electrodes. FIG. 2, FIG. 8, and FIG. 9 illustrate an example in which the first touch control electrode 10 includes multiple first electrodes 110 and multiple second electrodes 120, and the second touch control electrode includes multiple third electrodes 210 and multiple fourth electrodes 220. FIG. 10 illustrates an example in which the first touch control electrode 10 is a planar electrode, and the second touch control electrode includes multiple third electrodes 210 and multiple fourth electrodes 220. FIG. 11 illustrates an example in which the first touch control electrode 10 includes multiple first electrodes 110 and multiple second electrodes 120, and the second touch control electrode 20 is a planar electrode.

In an exemplary embodiment, when the first touch control electrode includes multiple first electrodes 110 and multiple second electrodes 120, the width of a first boundary electrode 110-1 is smaller than the width of a first non-boundary electrode 110-2, and the width of a second boundary electrode 120-1 is smaller than the width of a second non-boundary electrode 120-2. Herein, the first boundary electrode 110-1 is a first electrode close to the second touch control electrode, and the first non-boundary electrode 110-2 is a first electrode positioned at one side of the first boundary electrode away from the second touch control electrode; the second boundary electrode 120-1 is a second electrode close to the second touch control electrode, and the second non-boundary electrode 120-2 is a second electrode positioned at one side of the second boundary electrode away from the second touch control electrode.

In an exemplary embodiment, when the second touch control electrode includes multiple third electrodes and multiple fourth electrodes, the width of a third boundary electrode is smaller than the width of a third non-boundary electrode, and the width of a fourth boundary electrode is smaller than the width of a fourth non-boundary electrode; herein, the third boundary electrode is a third electrode close to the first touch control electrode, and the third non-boundary electrode is a third electrode positioned at one side of the third boundary electrode away from the first touch control electrode; the fourth boundary electrode is a fourth electrode close to the first touch control electrode, and the fourth non-boundary electrode is a fourth electrode positioned at one side of the fourth boundary electrode away from the first touch control electrode.

In an exemplary embodiment, as shown in FIGS. 8 and 9, a first branch segment 13 and a second branch segment 14 are respectively disposed on the first electrode 110 and the second electrode 120 forming a virtual region 300. The first branch segment 13 and the second branch segment 14 positioned within the same virtual region 300 may be spaced apart from each other, or may be connected to each other. FIG. 8 illustrates an example in which the first branch segment 13 and the second branch segment 14 positioned within the same virtual region 300 are spaced apart from each other. FIG. 9 illustrates an example in which the first branch segment 13 and the second branch segment 14 positioned within the same virtual region are connected to each other.

In an exemplary embodiment, the first branch segment 13 and the second branch segment 14 may both include multiple mesh patterns.

In an exemplary embodiment, shapes of the first branch segment 13 and the second branch segment 14 may include a cross shape or a square shape.

In an exemplary embodiment, an area of the virtual region in the touch control panel provided with the first branch segment 13 and the second branch segment 14 is smaller than an area of the virtual region in the touch control panel without the first branch segment 13 and the second branch segment 14.

In an exemplary embodiment, as shown in FIGS. 8 and 9, a third branch segment 23 and a fourth branch segment 24 are respectively disposed on the third electrode 210 and the fourth electrode 220 forming a virtual region 300. The third branch segment 23 and the fourth branch segment 24 positioned within the same virtual region may be spaced apart from each other, or may be connected to each other. FIG. 8 illustrates an example in which the third branch segment 23 and the fourth branch segment 24 positioned within the same virtual region 300 are spaced apart from each other. FIG. 9 illustrates an example in which the third branch segment 23 and the fourth branch segment 24 positioned within the same virtual region are connected to each other.

In an exemplary embodiment, the third branch segment 23 and the fourth branch segment 24 may both include multiple mesh patterns.

In an exemplary embodiment, shapes of the third branch segment 23 and the fourth branch segment 24 may include a cross shape or a square shape.

In an exemplary embodiment, an area of the virtual region in the touch control panel provided with the third branch segment 23 and the fourth branch segment 24 is smaller than an area of the virtual region in the touch control panel without the third branch segment 23 and the fourth branch segment 24.

In an exemplary embodiment, the touch control panel may further include a metal structure disposed in a same layer as the touch control electrode. Herein, the metal structure is positioned in the virtual region, and the metal structure includes multiple mesh patterns. The metal structure has no voltage when implementing touch control.

Figure 12:
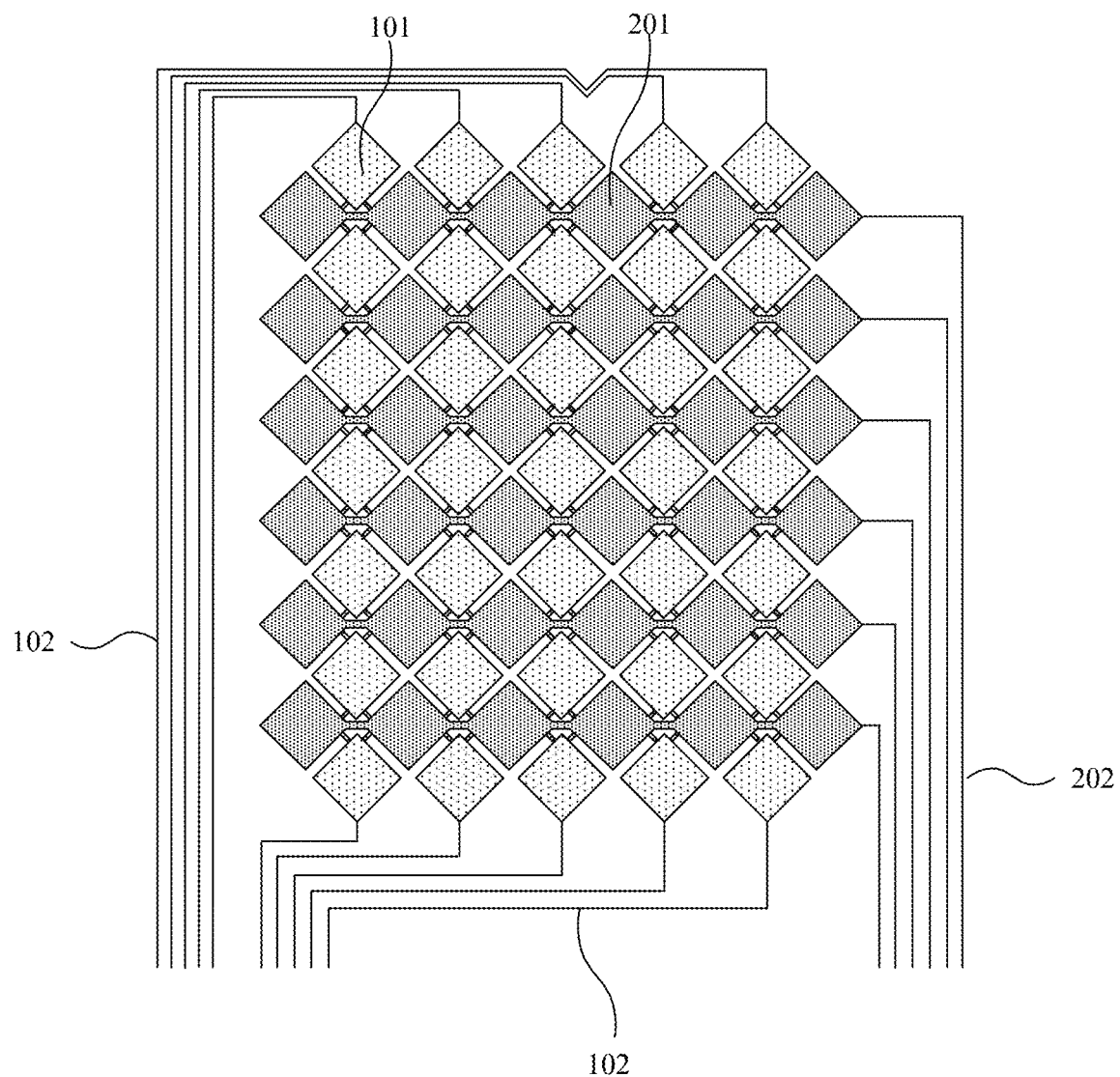
FIG. 12 is a schematic diagram of a structure of a touch control panel provided by an exemplary embodiment.

FIG. 12 is a schematic diagram of a structure of a touch control panel provided by an exemplary embodiment. As shown in FIG. 12, the touch control panel provided by an exemplary embodiment may further include multiple first touch control traces 102 and multiple second touch control traces 202 positioned in a touch control layer.

In an exemplary embodiment, the first touch control traces 102 are connected with the first touch control structures 101, and different first touch control traces 102 are connected to different first touch control structures 101.

In an exemplary embodiment, the second touch control traces 202 are connected with the second touch control structures 201, and different second touch control traces 202 are connected to different second touch control structures 201.

In an exemplary embodiment, the first touch control trace and the first touch control electrode may be an integrally formed structure.

In an exemplary embodiment, the second touch control trace and the second touch control electrode may be an integrally formed structure.

In an exemplary embodiment, the first touch control trace 102 may be connected with a first end and a second end of the first touch control structure.

In an exemplary embodiment, the second touch control trace 202 may be connected with one end of the second touch control structure.

In an exemplary embodiment, taking the first touch control structure being the driving electrode, and the second touch control structure being the induction electrode as an example, when the touch control panel works, a driving signal is inputted to the first one first touch control structure, each of the second touch control structures receives the signal in turn, a driving signal is inputted to the second one first touch control structure, each of the second touch control structures receives the signal in turn, and so on, until a driving signal is inputted to the last one first touch control structure. The touch control of a human finger will result in that a mutual capacitance of the first touch control structure and the second touch control structure changes, and a position of the finger is determined according to the change of the mutual capacitance of the first touch control structure and the second touch control structure.

Taking the touch control panel disposed on a display panel as an example, Table 1 shows a first simulation result of various touch control parameters of different touch control panels. Herein, a touch control panel 1 refers to a touch control panel in which the edge of the first touch control branch is not serrated, and the length of the first touch control branch is less than 400 microns. A touch control panel 2 and a touch control panel 3 refer to touch control panels in which the edge of the first touch control branch is serrated, the length of the first touch control branch is greater than 400 microns, and the first touch control branch includes a first branch segment, a second branch segment, a third branch segment, and a fourth branch segment included in the virtual region. Herein, a length of the touch control branch in the touch control panel 3 is greater than a length of the touch control branch in the touch control panel 2, and a quantity of protrusions of the touch control branch in the touch control panel 3 is greater than a quantity of protrusions of the touch control branch in the touch control panel 2, wherein the touch control branch includes the first touch control branch and the second touch control branch. In the touch control panel 2, the first branch segment and the second branch segment positioned in the same virtual region are spaced apart from each other, and the third branch segment and the fourth branch segment positioned in the same virtual region are spaced apart from each other. In the touch control panel 3, the first branch segment and the second branch segment positioned in the same virtual region are connected to each other, and the third branch segment and the fourth branch segment positioned in the same virtual region are connected to each other.

TABLE 1

| Touch control panel | 1 | 2 | 3 |
|---|---|---|---|
| TX/RX | 39/34 | 40/17 | 39/34 |
| Cm1 (pF) | 0.721 | 1.260 | 1.115 |
| Cm2 (pF) | 0.648 | 1.168 | 1.024 |
| ΔCm (pF) | 0.073 | 0.092 | 0.091 |
| ΔCm/Cm1 | 10.12% | 7.33% | 8.16% |
| CpTx (pF) | 6.536 | 10.979 | 410.449 |
| CpRx (pF) | 6.3 | 10.840 | 189.774 |
| CfTx (pF) | 0.406 | 0.353 | 0.382 |
| CfRx (pF) | 0.395 | 0.351 | 0.381 |
| LGM | 0.365 | 0.524 | 0.477 |
| Rtx (ohm) | 38.63 | 18.81 | 18.102 |
| Rrx (ohm) | 38 | 18.49 | 17.223 |

TX/RX refers to a quantity of driving electrodes TX and a quantity of induction electrodes RX, Cm1 is a mutual capacitance value between the driving electrode TX and the induction electrode RX before touch control occurs, Cm2 is a mutual capacitance value between the driving electrode TX and the induction electrode RX after touch control occurs, ΔCm is the change amount of the mutual capacitance value before and after the touch control, ΔCm=|Cm2−Cm1|, ΔCm/Cm1 is a ratio of the change amount of the mutual capacitance value before and after the touch control to the mutual capacitance value between the driving electrode TX and the induction electrode RX before the touch control occurs, CpTx is a capacitance value of a parasitic capacitance between the driving electrode and an electrode layer in the display panel, CpRx is a capacitance value of a parasitic capacitance between the induction electrode and the electrode layer in the display panel, CfTx is a capacitance value between the driving electrode and a touch control object, CfRx is a capacitance value between the induction electrode and the touch control object, Rtx is a resistance of the driving electrode TX, Rrx is a resistance of the induction electrode RX, LGM is a low ground mass, and the low ground mass LGM=ΔCm/CfTx+ΔCm/CfRx. The parameters in Table 1 are all obtained by simulation with the touch control object being made of copper.

In an exemplary embodiment, low ground refers to that an apparatus including the touch control panel and the human body have no common ground. In a low ground state, a retransmission effect is obvious, and the difficulty of charge transfer to the earth increases, as a result, the change amount of the mutual capacitance value collected is relatively small, thereby resulting in that it is difficult to accurately identify the touch control. Therefore, the touch control performance in the low ground state is relatively poor. The greater the low ground mass, the better the touch control performance.

As shown in the Table 1, comparing the touch control panel 1 with the touch control panel 2, the touch control panel 1 has 39 driving electrodes and 34 induction electrodes as an example, and the touch control panel 2 has 40 driving electrodes and 17 induction electrodes as an example. A sum of quantities of the induction electrodes and the driving electrodes in the touch control panel 1 is greater than a sum of quantities of the induction electrodes and the driving electrodes in the touch control panel 2. Although the sum of the quantities of the induction electrodes and the driving electrodes in the touch control panel 1 is greater than the sum of the quantities of the induction electrodes and the driving electrodes in the touch control panel 2, since the edges of the first touch control branch and the second touch control branch in the touch control panel 2 are serrated, and the length of the first touch control branch and the length of the second touch control branch are greater than a threshold length, the Cm1 and the Cm2 of the touch control panel 2 are both greater than the Cm1 and the Cm2 of the touch control panel 1, which verifies that the configuration of the first touch control branch and the second touch control branch in the present disclosure increases the interaction area of the induction electrode and the driving electrode, and increases the mutual capacitance value. The ΔCm of the touch control panel 2 is greater than the ΔCm of the touch control panel 1, and the ΔCm/Cm1 of the touch control panel 2 is smaller than the ΔCm/Cm1 of the touch control panel 1. The CpTx and the CpRx of the touch control panel 2 are both greater than the CpTx and the CpRx of the touch control panel 1, and the CfTx and the CfRx of the touch control panel 2 are both smaller than the CfTx and the CfRx of the touch control panel 1. The LGM of the touch control panel 2 is greater than the LGM of the touch control panel 1. The configuration of the first touch control branch and the second touch control branch in the present disclosure increases the signal amount of the low ground mass of the touch control panel, and improves the touch control performance of the touch control panel. The Rtx and the Rrx of the touch control panel 2 are both smaller than the Rtx and the Rrx of the touch control panel 1. Compared with the touch control panel 1, resistances of the induction electrode and the driving electrode of the touch control panel 2 are relatively small, reducing a load of the touch control panel, which may improve the touch control performance of the touch control panel.

As shown in Table 1, the touch control panel 1 and the touch control panel 3 both have 39 driving electrodes and 34 induction electrodes as an example. Since the edges of the first touch control branch and the second touch control branch in the touch control panel 3 are serrated, and the length of the first touch control branch and the length of the second touch control branch are greater than a threshold length, the Cm1 and the Cm2 of the touch control panel 3 are both greater than the Cm1 and the Cm2 of the touch control panel 1, which verifies that the configuration of the first touch control branch and the second touch control branch in the present disclosure increases the interaction area of the induction electrode and the driving electrode, and increases the mutual capacitance value. The ΔCm of the touch control panel 3 is greater than the ΔCm of the touch control panel 1, and the ΔCm/Cm1 of the touch control panel 3 is smaller than the ΔCm/Cm1 of the touch control panel 1. The CpTx and the CpRx of the touch control panel 3 are both greater than the CpTx and the CpRx of the touch control panel 1, and the CfTx and the CfRx of the touch control panel 3 are both smaller than the CfTx and the CfRx of the touch control panel 1. The LGM of the touch control panel 3 is greater than the LGM of the touch control panel 1. The configuration of the first touch control branch and the second touch control branch in the present disclosure increases the signal amount of the low ground mass of the touch control panel, and improves the touch control performance of the touch control panel. The Rtx and the Rrx of the touch control panel 3 are both smaller than the Rtx and the Rrx of the touch control panel 1. Compared with the touch control panel 1, the resistances of the induction electrode and the driving electrode of the touch control panel 3 are relatively small, reducing the load of the touch control panel, which may improve the touch control performance of the touch control panel.

As shown in the Table 1, comparing the touch control panel 2 with the touch control panel 3, the touch control panel 3 has 39 driving electrodes and 34 induction electrodes as an example, and the touch control panel 2 has 40 driving electrodes and 17 induction electrodes as an example. A sum of quantities of the induction electrodes and the driving electrodes of the touch control panel 3 is greater than a sum of quantities of the induction electrodes and the driving electrodes of the touch control panel 2. The Cm1 and the Cm2 of the touch control panel 2 are both greater than the Cm1 and the Cm2 of the touch control panel 3. The ΔCm of the touch control panel 2 is greater than the ΔCm of the touch control panel 3, and the ΔCm/Cm1 of the touch control panel 2 is smaller than the ΔCm/Cm1 of the touch control panel 3. The CpTx and the CpRx of the touch control panel 3 are both greater than the CpTx and the CpRx of the touch control panel 2, and the CfTx and the CfRx of the touch control panel 3 are both smaller than the CfTx and the CfRx of the touch control panel 2. The LGM of the touch control panel 2 is greater than the LGM of the touch control panel 3. The Rtx and the Rrx of the touch control panel 3 are both smaller than the Rtx and the Rrx of the touch control panel 2. Compared with the touch control panel 2, the resistances of the induction electrode and the driving electrode of the touch control panel 3 are relatively small, reducing the load of the touch control panel, which may improve the touch control performance of the touch control panel. The LGM, the Cm1, and the Cm2 of the touch control panel are not proportional to the sum of the quantities of the induction electrodes and the driving electrodes in the touch control panel, that is, it is not that the greater the sum of the quantities of the induction electrodes and the driving electrodes in the touch control panel, the greater the LGM, the Cm1, and the Cm2 of the touch control panel. The greater the sum of the quantities of the induction electrodes and the driving electrodes in the touch control panel, the greater the CpTx, the CpRx, the CfTx, and the CfRx of the touch control panel. The smaller the virtual region in the touch control panel, the smaller the LGM of the touch control panel. The longer the length of the touch control branch, the more the quantity of the protrusions of the touch control branch, and the greater the ΔCm/Cm1, and the greater the LGM.

Taking the touch control panel disposed on a display panel as an example, Table 2 shows a second simulation result of various touch control parameters of different touch control panels. Herein, touch control panels 4 to 9 are all touch control panels in which the edge of the first touch control branch and the edge of the second touch control branch are serrated, and the length of the first touch control branch and the length of the second touch control branch are greater than the threshold length. The touch control panel 4 is a touch control panel provided in FIG. 8, the touch control panel 5 and the touch control panel 6 are touch control panels provided in FIG. 9, the touch control panel 7 is the touch control panel provided in FIG. 2, and the touch control panel 8 and the touch control panel 9 are touch control panels provided in FIG. 10. Herein, comparing the touch control panel 5 with the touch control panel 4, the difference is that the virtual region in the touch control panel 5 is smaller than the virtual region in the touch control panel 4, and the length of the first touch control branch in the touch control panel 5 is greater than the length of the first touch control branch in the touch control panel 4, and the length of the second touch control branch in the touch control panel 5 is greater than the length of the second touch control branch in the touch control panel 4. Comparing the touch control panel 6 with the touch control panel 5, the difference is that the virtual region in the touch control panel 6 is smaller than the virtual region in the touch control panel 5. Comparing the touch control panel 7 with the touch control panel 5, the difference is that the virtual region in the touch control panel 7 is larger than the virtual region in the touch control panel 5, and the virtual region in the touch control panel 7 is a square shape. Comparing the touch control panel 8 with the touch control panel 6, the difference is that the induction electrode in the touch control panel 8 does not include the virtual region. Comparing the touch control panel 9 with the touch control panel 8, the difference is that the length of the first touch control branch in the touch control panel 9 is smaller than the length of the first touch control branch in the touch control panel 8, and the length of the second touch control branch in the touch control panel 9 is smaller than the length of the second touch control branch in the touch control panel 8.

TABLE 2

|  | Touch control panel | | | | | |
| --- | --- | --- | --- | --- | --- | --- |
|  | 4 | 5 | 6 | 7 | 8 | 9 |
| TX/RX | 40/17 | 40/17 | 40/17 | 40/17 | 40/17 | 40/17 |
| Cm1 (pF) | 1.010 | 1.260 | 1.248 | 1.245 | 1.250 | 1.206 |
| Cm2 (pF) | 0.932 | 1.168 | 1.151 | 1.148 | 1.152 | 1.112 |
| ΔCm (pF) | 0.078 | 0.092 | 0.097 | 0.096 | 0.098 | 0.094 |
| ΔCm/Cm1 | 7.72% | 7.33% | 7.81% | 7.74% | 7.84% | 7.76% |
| CpTx (pF) | 10.226 | 10.979 | 11.648 | 10.924 | 11.646 | 11.646 |
| CpRx (pF) | 9.956 | 10.840 | 11.513 | 10.790 | 12.122 | 12.125 |
| CfTx (pF) | 0.328 | 0.353 | 0.376 | 0.348 | 0.376 | 0.376 |
| CfRx (pF) | 0.347 | 0.351 | 0.375 | 0.347 | 0.398 | 0.398 |
| LGM | 0.463 | 0.524 | 0.519 | 0.554 | 0.507 | 0.484 |
| Rtx (ohm) | 17.32 | 18.81 | 16.08 | 16.75 | 16.15 | 15.17 |
| Rrx (ohm) | 16.75 | 18.49 | 15.53 | 16.22 | 13.90 | 13.01 |

As shown in Table 2, each of the touch control panels 4 to 9 has 40 driving electrodes and 17 induction electrodes, and the touch control object is made of copper for the simulation, as an example.

As shown in Table 2, comparing the touch control panel 5 with the touch control panel 4, the Cm1 and the Cm2 of the touch control panel 5 are both greater than the Cm1 and the Cm2 of the touch control panel 4. The ΔCm of the touch control panel 5 is greater than the ΔCm of the touch control panel 4, and the ΔCm/Cm1 of the touch control panel 5 is smaller than the ΔCm/Cm1 of the touch control panel 4. The CpTx and the CpRx of the touch control panel 5 are both greater than the CpTx and the CpRx of the touch control panel 4, and the CfTx and the CfRx of the touch control panel 5 are both greater than the CfTx and the CfRx of the touch control panel 4. The LGM of the touch control panel 5 is greater than the LGM of the touch control panel 4. The Rtx and the Rrx of the touch control panel 5 are both greater than the Rtx and the Rrx of the touch control panel 4. The smaller the virtual region in the touch control panel, and the longer the lengths of the first touch control branch and the second touch control branch, the greater the Cm1, the Cm2, the ΔCm, the CpTx, the CpRx, the CfTx, the CfRx, the LGM, the Rtx, and the Rrx of the touch control panel.

As shown in Table 2, comparing the touch control panel 6 with the touch control panel 5, the Cm1 and the Cm2 of the touch control panel 6 are both smaller than the Cm1 and the Cm2 of the touch control panel 5. The ΔCm of the touch control panel 6 is greater than the ΔCm of the touch control panel 5, and the ΔCm/Cm1 of the touch control panel 6 is greater than the ΔCm/Cm1 of the touch control panel 5. The CpTx and the CpRx of the touch control panel 6 are both greater than the CpTx and the CpRx of the touch control panel 5, and the CfTx and the CfRx of the touch control panel 6 are both greater than the CfTx and the CfRx of the touch control panel 5. The LGM of the touch control panel 6 is smaller than the LGM of the touch control panel 5. The Rtx and the Rrx of the touch control panel 6 are both smaller than the Rtx and the Rrx of the touch control panel 5. The smaller the virtual region in the touch control panel, the smaller the Cm1, the Cm2, the LGM, the Rtx, and the Rrx of the touch control panel, and the greater the ΔCm, the ΔCm/Cm1, the CpTx, the CpRx, the CfTx, and the CfRx.

As shown in Table 2, comparing the touch control panel 7 with the touch control panel 5, the Cm1 and the Cm2 of the touch control panel 7 are both smaller than the Cm1 and the Cm2 of the touch control panel 5. The ΔCm of the touch control panel 7 is greater than the ΔCm of the touch control panel 5, and the ΔCm/Cm1 of the touch control panel 7 is greater than the ΔCm/Cm1 of the touch control panel 5. The CpTx and the CpRx of the touch control panel 7 are both smaller than the CpTx and the CpRx of the touch control panel 5, and the CfTx and the CfRx of the touch control panel 7 are both smaller than the CfTx and the CfRx of the touch control panel 5. The LGM of the touch control panel 7 is greater than the LGM of the touch control panel 5. The Rtx and the Rrx of the touch control panel 7 are both smaller than the Rtx and the Rrx of the touch control panel 5. The larger the virtual region in the touch control panel, the greater the Cm1, the Cm2, the CpTx, the CpRx, the CfTx, and the CfRx, and the smaller the ΔCm, the ΔCm/Cm1, the LGM, the Rtx, and the Rrx.

As shown in Table 2, comparing the touch control panel 8 with the touch control panel 6, the Cm1 and the Cm2 of the touch control panel 8 are both greater than the Cm1 and the Cm2 of the touch control panel 6. The ΔCm of the touch control panel 8 is greater than the ΔCm of the touch control panel 6, and the ΔCm/Cm1 of the touch control panel 8 is greater than the ΔCm/Cm1 of the touch control panel 6. The CpTx of the touch control panel 8 is smaller than the CpTx of the touch control panel 6, the CpRx of the touch control panel 8 is greater than the CpRx of the touch control panel 6, the CfTx of the touch control panel 8 is equal to the CfTx of the touch control panel 6, and the CfRx of the touch control panel 8 is greater than the CfRx of the touch control panel 6. The LGM of the touch control panel 8 is smaller than the LGM of the touch control panel 6. The Rtx of the touch control panel 8 is greater than the Rtx of the touch control panel 6, and the Rrx of the touch control panel 8 is smaller than the Rrx of the touch control panel 6. The LGM of a touch control panel in which one electrode does not include a virtual region is smaller than that of a touch control panel in which the two electrodes both include virtual regions.

As shown in Table 2, comparing the touch control panel 9 with the touch control panel 8, the Cm1 and the Cm2 of the touch control panel 9 are both smaller than the Cm1 and the Cm2 of the touch control panel 8. The ΔCm of the touch control panel 9 is smaller than the ΔCm of the touch control panel 8, and the ΔCm/Cm1 of the touch control panel 9 is smaller than the ΔCm/Cm1 of the touch control panel 8. The CpTx and the CpRx of the touch control panel 9 are greater than or equal to the CpTx and the CpRx of the touch control panel 8, and the CfTx and the CfRx of the touch control panel 9 are both equal to the CfTx and the CfRx of the touch control panel 8. The LGM of the touch control panel 9 is smaller than the LGM of the touch control panel 8. The Rtx and the Rrx of the touch control panel 9 are both smaller than the Rtx and the Rrx of the touch control panel 8. The smaller the length of the first touch control branch and the length of the second touch control branch in the touch control panel, the smaller the Cm1, the Cm2, the ΔCm, the ΔCm/Cm1, the CpTx, the CpRx, the LGM, the Rtx, and the Rrx.

Figure 13:
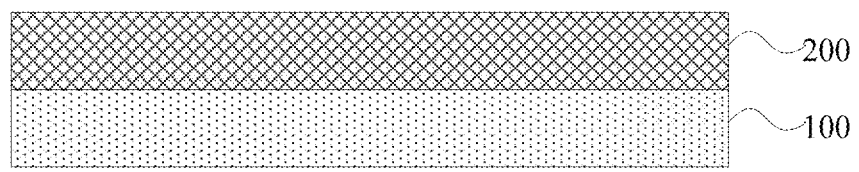
FIG. 13 is a schematic diagram of a structure of a touch control display panel provided by an embodiment of the present disclosure.

An embodiment of the present disclosure also provides a touch control display panel, and FIG. 13 is a schematic diagram of a structure of a touch control display panel provided by an embodiment of the present disclosure. As shown in FIG. 13, the touch control display panel provided by the embodiment of the present disclosure includes a display panel 100 and a touch control panel 200.

In an exemplary embodiment, the touch control panel 200 may be positioned at a light emitting side or a backlight side opposite to the light emitting side of the display panel 100. FIG. 13 illustrates an example in which the touch control panel is positioned at the light emitting side of the display panel.

In an exemplary embodiment, the display panel may be a Liquid Crystal Display (LCD) panel, or an Organic Light Emitting Diode (OLED) display panel, or a Plasma Display Panel (PDP), or an Electrophoretic Display (EPD) panel, or a Quantum Dot Light Emitting Diode (QLED) display panel.

Figure 14:
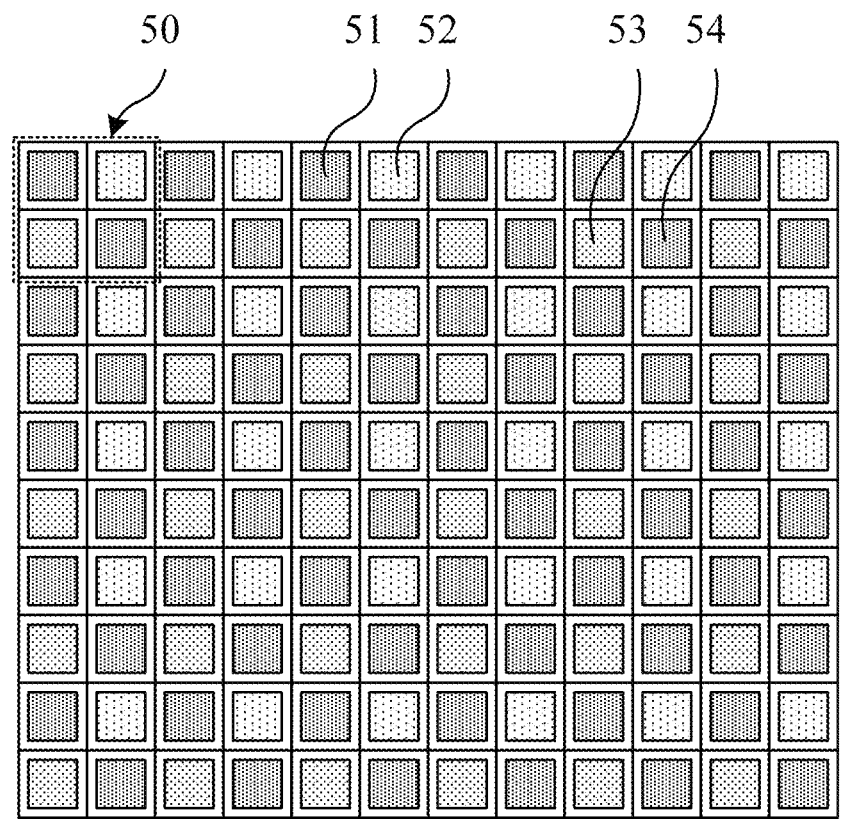
FIG. 14 is a schematic diagram of a planar structure of a display panel.

FIG. 14 is a schematic diagram of a planar structure of a display panel. In a plane parallel to the display panel, the display panel may include multiple pixel units arranged regularly.

In an exemplary embodiment, each of the pixel units may include 3 sub pixels, or may include 4 sub pixels, or may include multiple sub pixels. When the pixel unit includes three sub pixels, the three sub pixels include a first sub pixel emitting light of a first color, a second sub pixel emitting light of a second color, and a third sub pixel emitting light of a third color. When the pixel unit includes four sub pixels, the four sub pixels include a first sub pixel emitting light of a first color, a second sub pixel emitting light of a second color, a third sub pixel emitting light of a third color, and a fourth sub pixel emitting light of a fourth color. As an exemplary illustration, a pixel unit 50 shown in FIG. 12 includes four sub pixels, which are respectively a first sub pixel 51, a second sub pixel 52, a third sub pixel 53, and a fourth sub pixel 54, and shapes of the four sub pixels are all squares, and the four sub pixels are arranged in a square.

In an exemplary embodiment, the first sub pixel 51 and the fourth sub pixel 54 are green sub pixels emitting green (G) light, the second sub pixel 52 is a red sub pixel emitting red (R) light, and the third sub pixel 53 is a blue sub pixel emitting blue (B) light, which form the pixel unit 50 arranged in a square of RGGB. In some possible implementations, the first sub pixel 51 may be a green sub pixel, the second sub pixel 52 may be a red sub pixel, the third sub pixel 53 may be a blue sub pixel, and the fourth sub pixel 54 may be a white (W) sub pixel, which form the pixel unit 50 arranged in a square of RGBW.

In an exemplary embodiment, the pixel unit may include a red sub pixel, a green sub pixel, a blue sub pixel, a cyan sub pixel, a magenta sub pixel, a yellow sub pixel, and a white sub pixel.

Figure 15A:
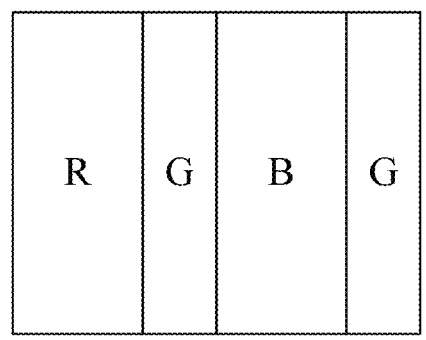
FIGS. 15A to 15C are schematic diagrams of structures of several pixel units.
Figure 15B:
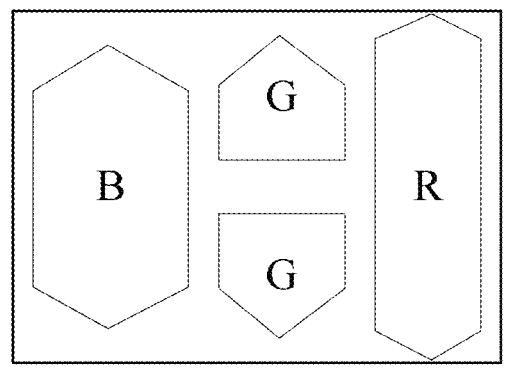
Figure 15C:
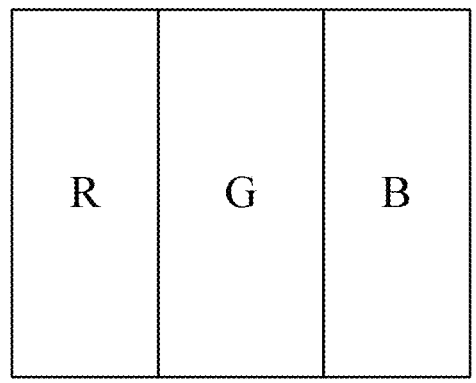

In an exemplary embodiment, the four sub pixels included in the pixel unit 50 may be of various shapes, and arranged in various manners. FIGS. 15A to 15C are schematic diagrams of structures of several pixel units. The four sub pixels may be rectangles, and arranged in parallel in an order of an R sub pixel, a G sub pixel, a B sub pixel, and a G sub pixel from left to right, as shown in FIG. 15A. Alternatively, the four sub pixels may be pentagons or hexagons, and arranged in parallel, two pentagonal G sub pixels are positioned in the middle of the pixel unit, a hexagonal R sub pixel and a hexagonal B sub pixel are positioned at two sides of the G sub pixels respectively, as shown in FIG. 15B. In an exemplary embodiment, when the pixel unit 50 includes three sub pixels, three rectangular sub pixels may be arranged in parallel in a horizontal direction, or in a vertical direction, as shown in FIG. 15C.

In an exemplary embodiment, the shape of a sub pixel may be any one or more of a triangle, a square, a rectangle, a rhombus, a trapezoid, a parallelogram, a pentagon, a hexagon, and other polygons, and sub pixels may be arranged in an X-shape, a cross shape, or a T shape, etc., which are not limited in the present disclosure here.

Figure 16:
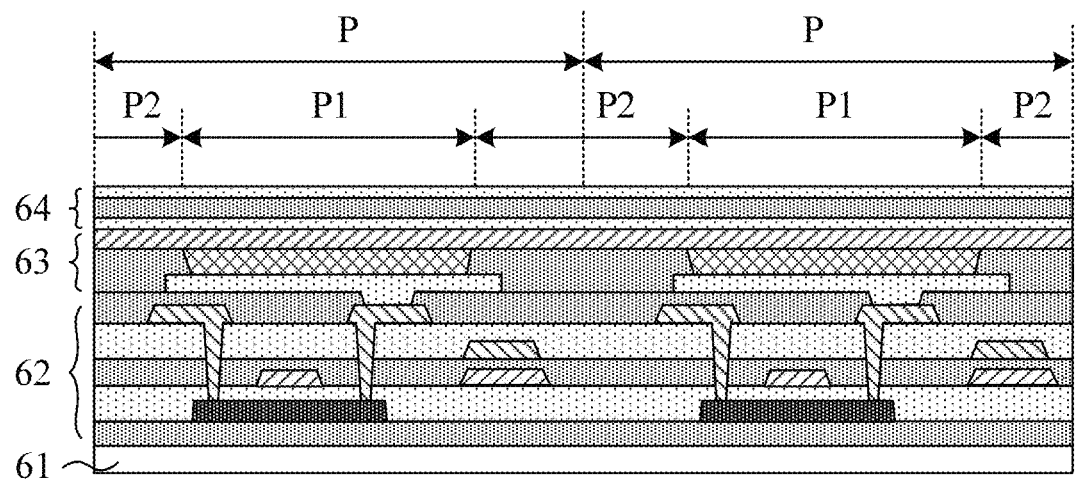
FIG. 16 is a schematic diagram of a sectional structure of a display panel.

FIG. 16 is a schematic diagram of a sectional structure of a display panel, which illustrates a structure of two sub pixels when the display panel is an OLED display panel. As shown in FIG. 16, in a plane perpendicular to the display panel, the display panel includes a driving circuit layer 62 disposed on a flexible substrate 61, a light emitting structure layer 63 disposed on the driving circuit layer 62, and an encapsulation layer 64 disposed on the light emitting structure layer 63.

In an exemplary implementation, the touch control panel may be disposed on the encapsulation layer 64, forming a structure of Touch on Thin Film Encapsulation (Touch on TFE).

In an exemplary embodiment, the display panel may include other film layers, and other film layers may be disposed between the touch control panel and the encapsulation layer, which are not limited in the present disclosure.

In an exemplary embodiment, the flexible substrate 61 may include a first flexible material layer, a first inorganic material layer, a semiconductor layer, a second flexible material layer, and a second inorganic material layer which are stacked, wherein materials of the first flexible material layer and the second flexible material layer may be polyimide (PI), polyethylene terephthalate (PET), or a surface-treated polymer soft film, etc., materials of the first inorganic material layer and the second inorganic material layer may be silicon nitride (SiNx) or silicon oxide (SiOx), etc., for improving water and oxygen resistance capability of the substrate, and a material of the semiconductor layer may be amorphous silicon (a-si).

In an exemplary embodiment, the driving circuit layer 62 may include a transistor and a storage capacitor forming a pixel circuit.

In an exemplary embodiment, the pixel circuit may be of a 3T1C, 4T1C, 5T1C, 5T2C, 6T1C, or 7T1C structure.

FIG. 15 illustrates an example in which each sub pixel includes one transistor and one storage capacitor. In an exemplary embodiment, a driving circuit layer 62 of each sub pixel may include a first insulating layer disposed on a flexible substrate, an active layer disposed on the first insulating layer, a second insulating layer covering the active layer, a first metal layer disposed on the second insulating layer, the first metal layer including a gate electrode and a first capacitor electrode, a third insulating layer covering the gate electrode and the first capacitor electrode, a second metal layer disposed on the third insulating layer, the second metal layer including a second capacitor electrode, a fourth insulating layer covering the second capacitor electrode, the fourth insulating layer being provided with a via hole exposing the active layer, a third metal layer disposed on the fourth insulating layer, the third metal layer including a source electrode and a drain electrode, and the source electrode and the drain electrode being connected with the active layer through the via hole respectively, and a planarization layer covering the aforementioned structure. Herein, the active layer, the gate electrode, the source electrode, and the drain electrode form the transistor, and the first capacitor electrode and the second capacitor electrode form the storage capacitor.

In an exemplary embodiment, the active layer may adopt a material such as amorphous indium gallium zinc oxide (a-IGZO), zinc oxynitride (ZnON), indium zinc tin oxide (IZTO), amorphous silicon (a-Si), polycrystalline silicon (p-Si), hexathiophene, or polythiophene, etc., and the present disclosure is applicable to transistors manufactured based on oxide technology, silicon technology, or organic substance technology.

In an exemplary embodiment, the first insulating layer, the second insulating layer, the third insulating layer, and the fourth insulating layer may adopt any one or more of silicon oxide (SiOx), silicon nitride (SiNx), or silicon oxynitride (SiON), and may be a single layer, multiple layers, or a composite layer. The first insulating layer may be referred to as a buffer layer, which is used to improve the water and oxygen resistance capability of the substrate. The second insulating layer and the third insulating layer may be referred to as gate insulating (GI) layers. The fourth insulating layer may be referred to as an interlayer insulating (ILD) layer.

In an exemplary embodiment, the first metal layer, the second metal layer, and the third metal layer may adopt a metal material, such as any one or more of silver (Ag), copper (Cu), aluminum (Al), titanium (Ti), and molybdenum (Mo), or an alloy material of the above metals, such as aluminum neodymium alloy (AlNd) or molybdenum niobium alloy (MoNb), and may be of a single-layer structure, or a multi-layer composite structure, such as Ti/Al/Ti.

In an exemplary embodiment, the planarization layer may adopt an organic material, and a transparent conductive thin film may adopt indium tin oxide (ITO) or indium zinc oxide (IZO).

In an exemplary embodiment, the light emitting structure layer 63 may include an anode, a pixel defining layer, an organic light emitting layer, and a cathode, wherein the anode is disposed on the planarization layer, and is connected with the drain electrode through a via hole on the planarization layer, the pixel defining layer is disposed on the anode and the planarization layer, the pixel defining layer is provided with a pixel opening exposing the anode, the organic light emitting layer is disposed within the pixel opening, the cathode is disposed on the organic light emitting layer, and the organic light emitting layer emits light of a corresponding color under actions of voltages applied by the anode and the cathode.

In an exemplary embodiment, the anode may adopt a transparent conductive material.

In an exemplary embodiment, the pixel defining layer may adopt polyimide, acrylic, or polyethylene terephthalate.

In an exemplary embodiment, the organic light emitting layer may include a Hole Injection Layer (HIL), a Hole Transport Layer (HTL), an Electron Block Layer (EBL), an Emitting Layer (EML), a Hole Block Layer (HBL), an Electron Transport Layer (ETL), and an Electron Injection Layer (EIL) that are stacked.

In an exemplary embodiment, hole injection layers of all sub pixels may be connected together to form a common layer, electron injection layers of all the sub pixels may be connected together to form a common layer, hole transport layers of all the sub pixels may be connected together to form a common layer, electron transport layers of all the sub pixels may be connected together to form a common layer, hole block layers of all the sub pixels may be connected together to form a common layer, emitting layers of adjacent sub pixels may be overlapped slightly, or may be isolated from each other, and electron block layers of adjacent sub pixels may be overlapped slightly, or may be isolated from each other.

In an exemplary embodiment, the cathode may adopt any one or more of magnesium (Mg), silver (Ag), aluminum (Al), copper (Cu), and lithium (Li), or an alloy made of any one or more of the above metals.

In an exemplary embodiment, the encapsulation layer 64 may include a first encapsulation layer, a second encapsulation layer, and a third encapsulation layer that are stacked. The first encapsulation layer and the third encapsulation layer may adopt an inorganic material, and the second encapsulation layer may adopt an organic material. The second encapsulation layer is disposed between the first encapsulation layer and the third encapsulation layer, and can ensure that outside water vapor cannot enter the light emitting structure layer 63.

In an exemplary embodiment, the display panel and the touch control panel are integrated together, which has advantages of lightness, thinness, foldability, etc., and can meet requirements of products such as flexibility and foldability, narrow frame, etc.

In an exemplary embodiment, as shown in FIG. 16, the substrate of the display panel includes a light emitting region P1 and a non-light emitting region P2, wherein the light emitting region P1 includes multiple sub pixels arranged periodically, and the non-light emitting region P2 includes a sub pixel edge positioned between adjacent sub pixels. The display panel includes a display region and a non-display region, wherein the display region includes the light emitting region and a first non-light emitting region, the non-display region includes a second non-light emitting region, and the non-light emitting region is composed of the first non-light emitting region and the second non-light emitting region.

In an exemplary embodiment, the touch control panel includes multiple metal meshes composed of multiple metal lines, a region surrounded by orthographic projections of metal lines on the substrate contains an orthographic projection of at least one sub pixel on the substrate, and an orthographic projection of the sub pixel edge on the substrate contains the orthographic projections of the metal lines on the substrate.

In an exemplary embodiment, that the region surrounded by the orthographic projections of the metal lines on the substrate contains the orthographic projection of the at least one sub pixel on the substrate and the orthographic projection of the sub pixel edge on the substrate contains the orthographic projections of the metal lines on the substrate, can ensure that the touch control panel does not affect the display of the display panel.

In an exemplary embodiment, since the organic light emitting layer emits light in a pixel opening region defined by the pixel defining layer, the pixel opening region is the light emitting region P1, and a region outside the pixel opening is the non-light emitting region P2, the non-light emitting region P2 being positioned at a periphery of the light emitting region P1. In an exemplary embodiment of the present disclosure, each light emitting region P1 is called a sub pixel, such as a red sub pixel, a blue sub pixel, or a green sub pixel, and each non-light emitting region P2 is called a sub pixel edge, such as a red-green sub pixel edge between a red sub pixel and a green sub pixel, or a blue-green sub pixel edge between a blue sub pixel and a green sub pixel. As such, the light emitting region of the display panel includes multiple sub pixels arranged periodically, and the non-light emitting region of the display structure layer includes the sub pixel edge positioned between adjacent sub pixels.

The touch control panel is the touch control panel provided by any one of the aforementioned embodiments, and their implementation principles and implementation effects are similar, which will not be repeated here.

Figure 17:
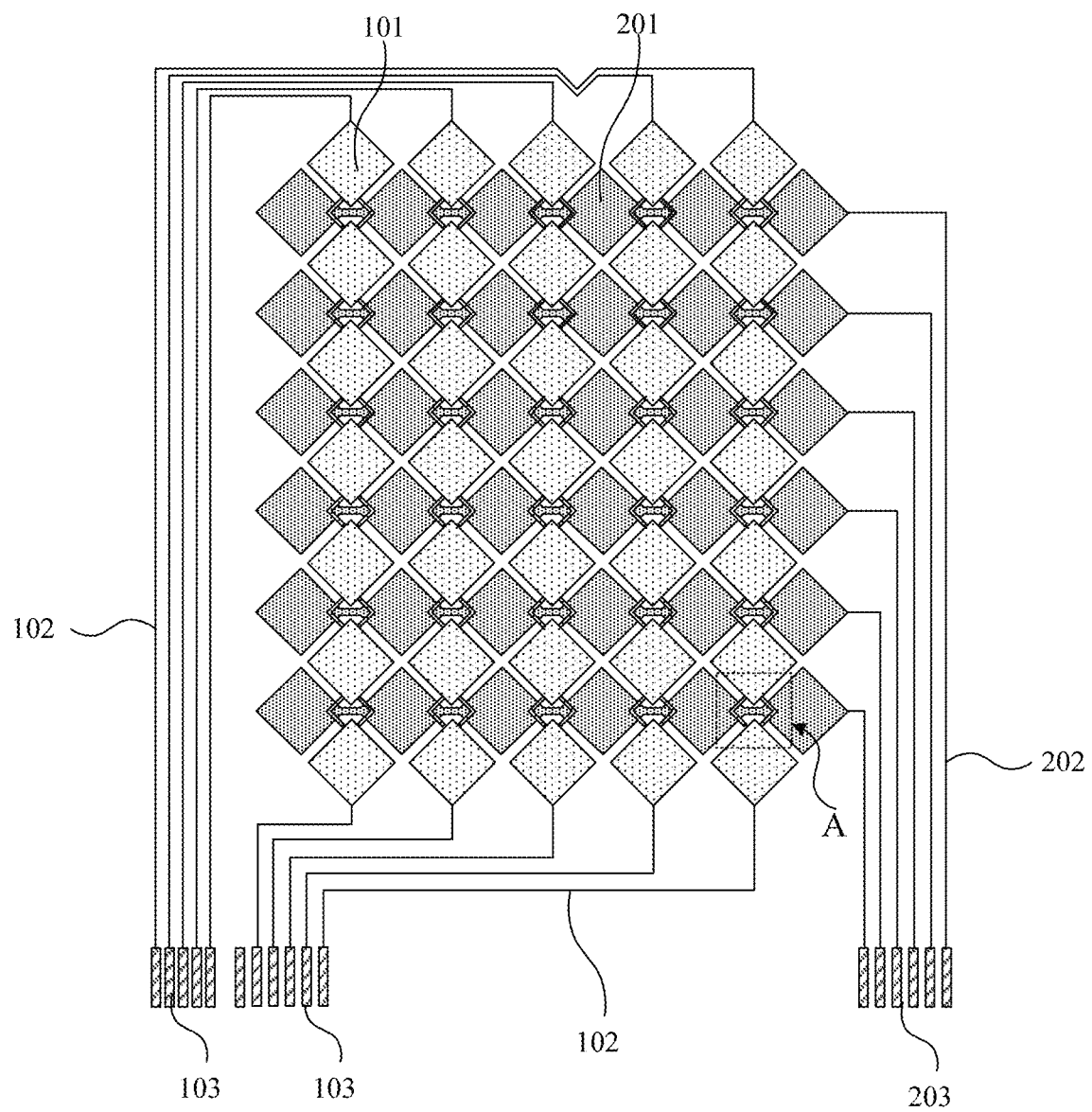
FIG. 17 is a schematic diagram of a structure of a touch control display panel provided by an exemplary embodiment.

FIG. 17 is a schematic diagram of a structure of a touch control display panel provided by an exemplary embodiment. As shown in FIG. 17, the display panel in the touch control display panel provided by an exemplary embodiment may further include a bonding pad region positioned in the non-display region. The touch control panel may include a first touch control trace 102 connected with a first touch control structure 101 and a second touch control trace 202 connected with a second touch control structure 201. Herein, the bonding pad region includes a first bonding pad electrode 103 and a second bonding pad electrode 203. Each first touch control structure is connected to a first bonding pad electrode through a first touch control trace, and each second touch control structure is connected to a second bonding pad electrode through a second touch control trace.

In an exemplary embodiment, the display panel may further include a touch control driving chip positioned in the non-display region. Herein, the touch control driving chip may be positioned at one side of the bonding pad region close to the display region.

In an exemplary embodiment, the first touch control structure is connected to the touch control driving chip through the first bonding pad electrode, and the second touch control structure is connected to the touch control driving chip through the second bonding pad electrode.

An embodiment of the present disclosure also provides a touch control display apparatus, including a touch control display panel.

In an exemplary embodiment, the touch control display apparatus may be any product or component with a display function such as a mobile phone, a tablet computer, a television, a display, a notebook computer, a digital photo frame, or a navigator, etc.

The touch control display panel is the touch control display panel provided by any one of the aforementioned embodiments, and their implementation principles and implementation effects are similar, which will not be repeated here.

The accompanying drawings of the present disclosure only involve the structures involved in the embodiments of the present disclosure, and the other structures may refer to conventional designs.

For the sake of clarity, in the accompanying drawings used to illustrate the embodiments of the present disclosure, the thickness and dimension of a layer or a micro structure is enlarged. It may be understood that when an element such as a layer, a film, a region, or a substrate is described as being "on" or "under" another element, it may be "directly" positioned "on" or "under" the other element, or there may be an intermediate element.

Although the embodiments disclosed in the present disclosure are as above, the described contents are only embodiments used for convenience of understanding the present disclosure and are not intended to limit the present disclosure. Any person skilled in the art to which the present disclosure pertains may make any modification and variation in implementation forms and details without departing from the spirit and scope disclosed in the present disclosure.

However, the scope of patent protection of the present disclosure is still subject to the scope defined by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A touch control panel, comprising: a plurality of first touch control structures extending along a first direction and a plurality of second touch control structures extending along a second direction, wherein the plurality of first touch control structures are arranged along the second direction, and the plurality of second touch control structures are arranged along the first direction; a first touch control structure comprises a plurality of first touch control electrodes and a plurality of first connecting parts, and a second touch control structure comprises a plurality of second touch control electrodes and a plurality of second connecting parts, wherein the first direction and the second direction intersect; the first touch control electrodes and the second touch control electrodes are disposed in a same layer, and the first connecting parts or the second connecting parts are disposed in the same layer as the first touch control electrodes;
wherein the first touch control electrode, the second touch control electrode, a first connecting part, and a second connecting part each comprise a plurality of mesh patterns; wherein, a mesh pattern is a polygon composed of metal lines;
wherein the first touch control electrode is a planar electrode; or
the first touch control electrode comprises a plurality of first electrodes extending along a fourth direction and a plurality of second electrodes extending along a fifth direction; a first electrode and a second electrode each comprise a plurality of mesh patterns, and a plurality of virtual regions are defined between the plurality of first electrodes and the plurality of second electrodes;
the fourth direction and the fifth direction intersect, and the fourth direction and the fifth direction are both different from the first direction and the second direction;
wherein a width of a first boundary electrode is smaller than a width of a first non-boundary electrode, and a width of a second boundary electrode is smaller than a width of a second non-boundary electrode;
wherein the first boundary electrode is a first electrode close to a second touch control electrode, and the first non-boundary electrode is a first electrode positioned at one side of the first boundary electrode away from the second touch control electrode; the second boundary electrode is a second electrode close to a second touch control electrode, and the second non-boundary electrode is a second electrode positioned at one side of the second boundary electrode away from the second touch control electrode.

2. The touch control panel of claim 1, wherein the touch control panel further comprises: at least one touch control branch positioned at an edge of a touch control electrode, an extending direction of each touch control branch intersects with an extending direction of the edge of the touch control electrode at which the touch control branch is positioned, the extending direction of the touch control branch is different from the first direction and the second direction, and the touch control electrode comprises a first touch control electrode and/or a second touch control electrode;
a length of the touch control branch is greater than a length of a connecting part disposed in the same layer as the first touch control electrodes along a third direction, the third direction is the same as an extending direction of part of touch control branches, and intersects with the first direction and the second direction;
wherein the touch control branch comprises the plurality of mesh patterns.

3. The touch control panel of claim 1, wherein
the second touch control electrode is a planar electrode; or
the second touch control electrode comprises a plurality of third electrodes extending along a fifth direction and a plurality of fourth electrodes extending along a fourth direction; a third electrode and a fourth electrode each comprise a plurality of mesh patterns, and a plurality of virtual regions are defined between the plurality of third electrode and the plurality of fourth electrode;
the fourth direction and the fifth direction intersect, and the fourth direction and the fifth direction are both different from the first direction and the second direction.

4. The touch control panel of claim 3, wherein
a width of a third boundary electrode is smaller than a width of a third non-boundary electrode, and a width of a fourth boundary electrode is smaller than a width of a fourth non-boundary electrode;
wherein the third boundary electrode is a third electrode close to a first touch control electrode, and the third non-boundary electrode is a third electrode positioned on one side of the third boundary electrode away from the first touch control electrode; the fourth boundary electrode is a fourth electrode close to a first touch control electrode, and the fourth non-boundary electrode is a fourth electrode positioned on one side of the fourth boundary electrode away from the first touch control electrode.

5. The touch control panel of claim 4, wherein a first branch segment and a second branch segment are respectively disposed on a first electrode and a second electrode forming a virtual region;
the first branch segment and the second branch segment positioned within the same virtual region are spaced apart from each other, or connected to each other;
the first branch segment and the second branch segment each comprise a plurality of mesh patterns;
shapes of the first branch segment and the second branch segment comprise a cross shape or a square shape;
and/or,
a third branch segment and a fourth branch segment are respectively disposed on a third electrode and a fourth electrode forming a virtual region;
the third branch segment and the fourth branch segment positioned within the same virtual region are spaced apart from each other, or connected to each other;
the third branch segment and the fourth branch segment each comprise a plurality of mesh patterns;
shapes of the third branch segment and the fourth branch segment comprise a cross shape or a square shape.

6. The touch control panel of claim 1, wherein the touch control branch comprises: a branch body and at least one protrusion positioned at an edge of the branch body;
when a quantity of the touch control branches is at least two, the at least two touch control branches are spaced apart from each other, and the at least two touch control branches are positioned at two sides of the touch control electrode.

7. The touch control panel of claim 6, wherein a length of the branch body is greater than half of a length of the touch control electrode, where the touch control branch is positioned, along the extending direction of the touch control branch.

8. The touch control panel of claim 6, wherein the branch body comprises a first side and a second side opposite to each other and a third side and a fourth side opposite to each other; the third side is connected with the touch control electrode where the touch control branch is positioned;
the at least one protrusion is positioned at the first side and the second side of the branch body;
protrusions positioned at the first side of the branch body are staggered with protrusions positioned at the second side of the branch body.

9. The touch control panel of claim 8, wherein a width of a protrusion close to the touch control electrode where the touch control branch is positioned is greater than a width of a protrusion away from the touch control electrode in which the touch control branch is positioned.

10. The touch control panel of claim 6, wherein when a touch control electrode comprises the first touch control electrode and the second touch control electrode, a touch control branch on the first touch control electrode is a first touch control branch, wherein the first touch control branch comprises a first branch body and at least one first protrusion positioned at an edge of the first branch body; a touch control branch on the second touch control electrode is a second touch control branch, wherein the second touch control branch comprises a second branch body and at least one second protrusion positioned at an edge of the second branch body;
when quantities of first touch control branches and second touch control branches are both at least two, the at least two first touch control branches are spaced apart from each other, and the at least two second touch control branches are spaced apart from each other; at least one first touch control branch is positioned between adjacent second touch control branches, and at least one second touch control branch is positioned between adjacent first touch control branches;
a maximum spacing between adjacent first touch control branches is greater than a maximum width of the second touch control branches;
a maximum spacing between adjacent second touch control branches is greater than a maximum width of the first touch control branches.

11. The touch control panel of claim 10, wherein a first groove is formed between adjacent first touch control branches, and a second touch control branch and the first groove fit with each other;
a second groove is formed between adjacent second touch control branches, and a first touch control branch and the second groove fit with each other.

12. The touch control panel of claim 10, wherein a shape of the first branch body and a shape of the second branch body both comprise a rectangle;
a shape of the first protrusion and a shape of the second protrusion both comprise a rectangle, a triangle, or a wavy shape.

13. The touch control panel of claim 10, wherein the first touch control branch and the first touch control electrode are an integrally formed structure;

the second touch control branch and the second touch control electrode are an integrally formed structure.

14. The touch control panel of claim 1, comprising: a buffer layer, a bridge connection layer, an insulating layer, a touch control layer, and a protection layer stacked sequentially;
wherein the touch control layer comprises the plurality of first touch control electrodes, the plurality of first connecting parts, and the plurality of second touch control electrodes; the plurality of first touch control electrodes and the plurality of first connecting parts are alternately disposed and connected in turn, and the plurality of second touch control electrodes are spaced;
the bridge connection layer comprises the plurality of second connecting parts, each of the second connecting parts comprises two first connecting structures symmetrically disposed with respect to a first symmetrical axis, each of the first connecting structures comprises a first bonding pad part and a first connecting bridge; the first bonding pad part is configured to be connected with an adjacent second touch control electrode through a via hole on the insulating layer, the first connecting bridge is configured to be connected to the first bonding pad part, wherein the first symmetry axis extends along the second direction;
or, the touch control panel comprising: a buffer layer, a bridge connection layer, an insulating layer, a touch control layer, and a protection layer stacked sequentially;
wherein the touch control layer comprises the plurality of second touch control electrodes, the plurality of second connecting parts, and the plurality of first touch control electrodes; the plurality of second touch control electrodes and the plurality of second connecting parts are alternately disposed and connected in turn, and the plurality of first touch control electrodes are spaced;
the bridge connection layer comprises the plurality of first connecting parts, each of the first connecting parts comprises two second connecting structures symmetrically disposed with respect to a second symmetrical axis, each of the second connecting structures comprises a second bonding pad part and a second connecting bridge; the second bonding pad part is configured to be connected with an adjacent first touch control electrode through a via hole on the insulating layer, the second connecting bridge is configured to be connected to the first bonding pad part, wherein the second symmetry axis extends along the first direction.

15. The touch control panel of claim 14, wherein the first connecting bridge has a closed-loop structure composed by a plurality of first connecting traces; or
the second connecting bridge has a closed-loop structure composed by a plurality of second connecting traces.

16. The touch control panel of claim 14, wherein each of the first connecting parts comprises: a first sub-connecting part, a first sub-connecting structure, and a second sub-connecting part;
the first sub-connecting part and the second sub-connecting part are respectively positioned on first touch control branches of two first touch control electrodes which the first connecting part is connected to, and the first sub-connecting structure is positioned between the first sub-connecting part and the second sub-connecting part;
a length of the first sub-connecting part along the third direction and a length of the second sub-connecting part along the third direction are both less than half of a length of the first touch control branches;

or, each of the second connecting parts comprises: a third sub-connecting part, a second sub-connecting structure, and a fourth sub-connecting part connected to each other;

the third sub-connecting part and the fourth sub-connecting part are respectively positioned on second touch control branches of two second touch control electrodes which the second connecting part is connected to, and the second sub-connecting structure is positioned between the third sub-connecting part and the fourth sub-connecting part;

a length of the third sub-connecting part along the third direction and a length of the fourth sub-connecting part along the third direction are both less than half of a length of the second touch control branches.

17. The touch control panel of claim 1, further comprising: a metal structure disposed in a same layer as the touch control electrode;

the metal structure is positioned within a virtual region, and the metal structure comprises a plurality of mesh patterns.

18. The touch control panel of claim 10, wherein a length of the first touch control branch is about 450 microns to 600 microns;

a length of the second touch control branch is about 450 microns to 600 microns.

19. A touch control display panel, comprising a display panel and a touch control panel of claim 1;

wherein the touch control panel is positioned at a light emitting side or a backlight side opposite to the light emitting side of the display panel;

the display panel comprises a substrate, wherein the substrate comprises a light emitting region and a non-light emitting region, the light emitting region comprises a plurality of sub pixels arranged periodically, and the non-light emitting region comprises a sub pixel edge positioned between adjacent sub pixels; the touch control panel comprises a plurality of metal meshes composed of metal lines;

a region surrounded by orthographic projections of metal lines on the substrate contains an orthographic projection of at least one sub pixel on the substrate, and an orthographic projection of the sub pixel edge on the substrate contains the orthographic projections of the metal lines on the substrate.

20. A touch control display apparatus, comprising the touch control display panel of claim 19.

* * * * *